Feb. 11, 1936. J. T. SCHAAFF 2,030,405
RECORD PERFORATING MACHINE
Filed March 21, 1934 22 Sheets-Sheet 1

INVENTOR
John T. Schaaff,
Deceased,
By Lillian A. Schaaff,
Executrix,
BY ATTORNEY
A.C. Maby Feb. 11, 1936.   J. T. SCHAAFF   2,030,405
RECORD PERFORATING MACHINE
Filed March 21, 1934   22 Sheets-Sheet 2

INVENTOR
John T. Schaaff, Deceased,
By Lillian A. Schaaff, Executrix,
BY   ATTORNEY Feb. 11, 1936.     J. T. SCHAAFF     2,030,405
RECORD PERFORATING MACHINE
Filed March 21, 1934     22 Sheets-Sheet 3

INVENTOR
John T. Schaaff, Deceased,
By Lillian A. Schaaff, Executrix,
BY     ATTORNEY

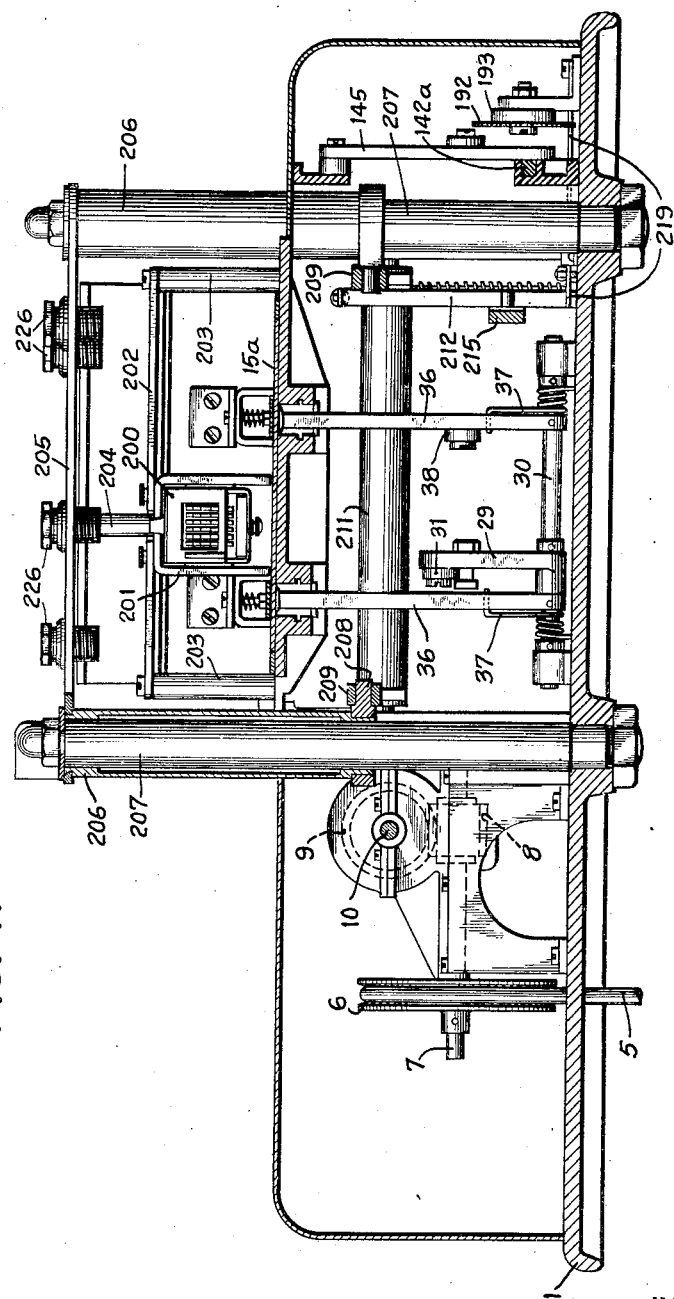

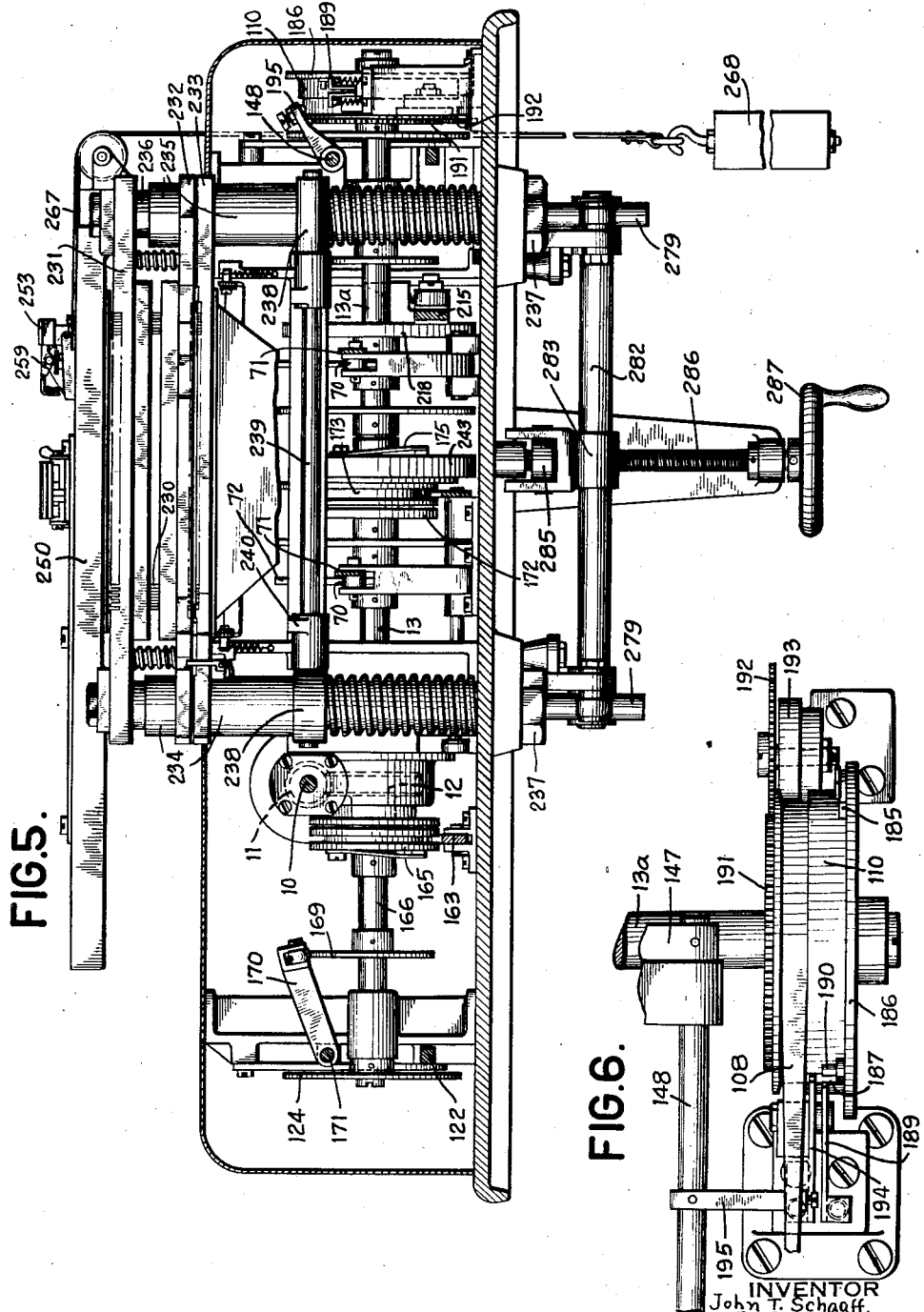

Feb. 11, 1936.   J. T. SCHAAFF   2,030,405
RECORD PERFORATING MACHINE
Filed March 21, 1934   22 Sheets-Sheet 6
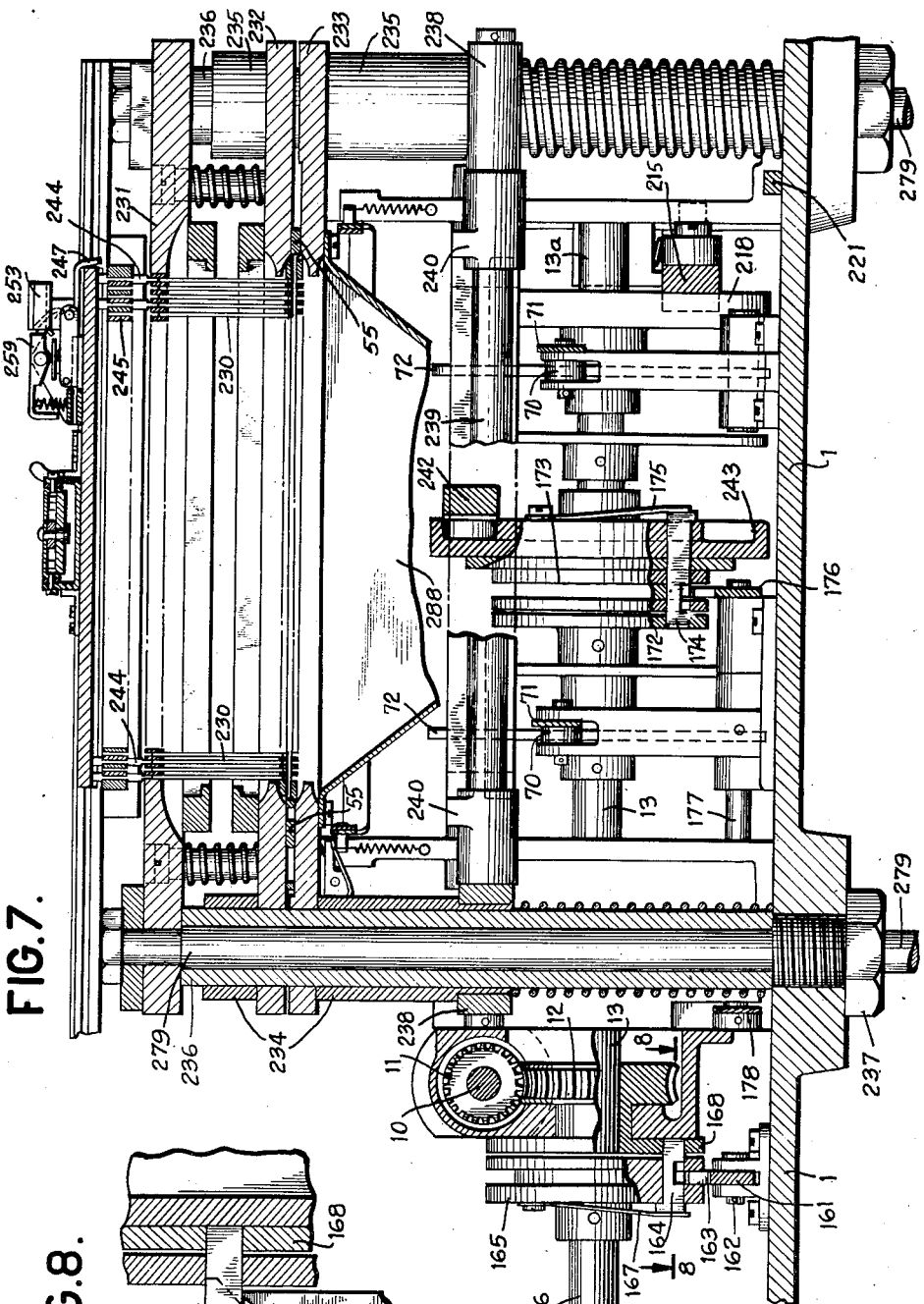
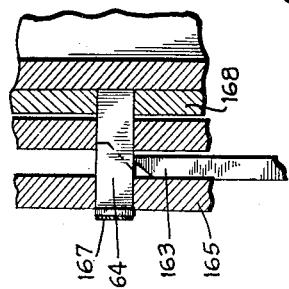
INVENTOR
John T. Schaaff, Deceased,
By Lillian A. Schaaff, Executrix,
BY   ATTORNEY Feb. 11, 1936.  J. T. SCHAAFF  2,030,405
RECORD PERFORATING MACHINE
Filed March 21, 1934  22 Sheets-Sheet 7
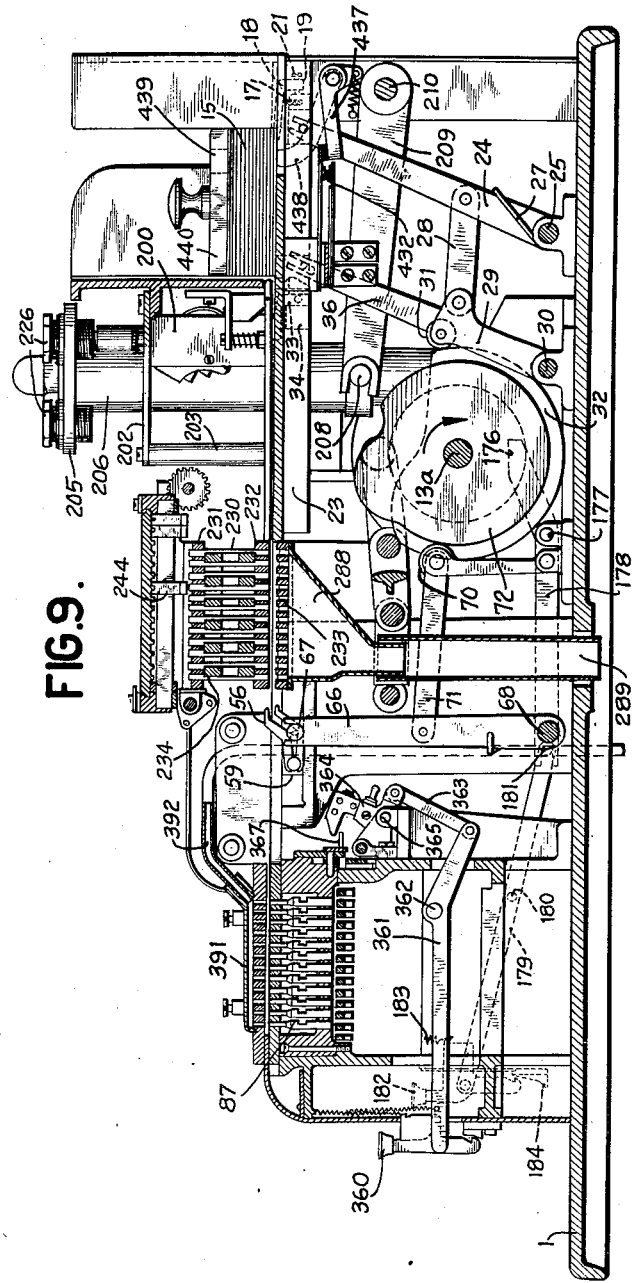
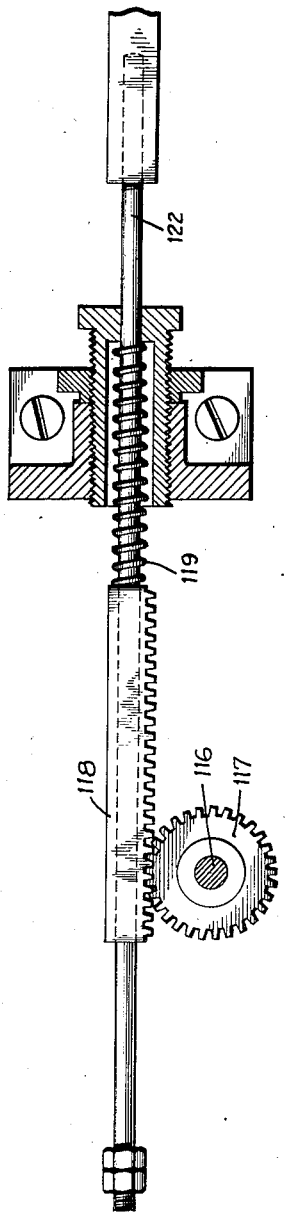
INVENTOR
John T. Schaaff, Deceased,
By Lillian A. Schaaff, Executrix,
BY    ATTORNEY

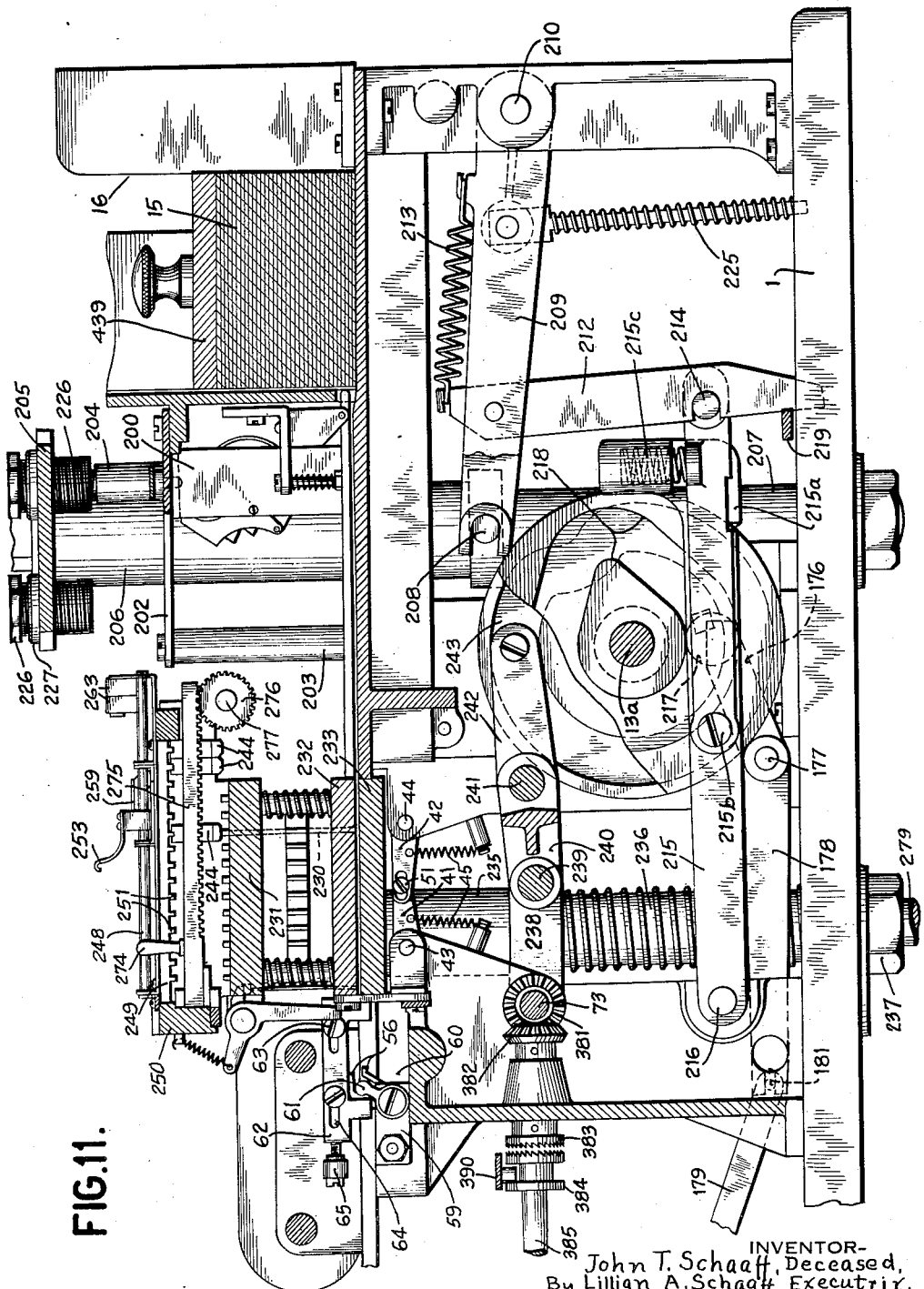

Feb. 11, 1936.   J. T. SCHAAFF   2,030,405
RECORD PERFORATING MACHINE
Filed March 21, 1934   22 Sheets-Sheet 9
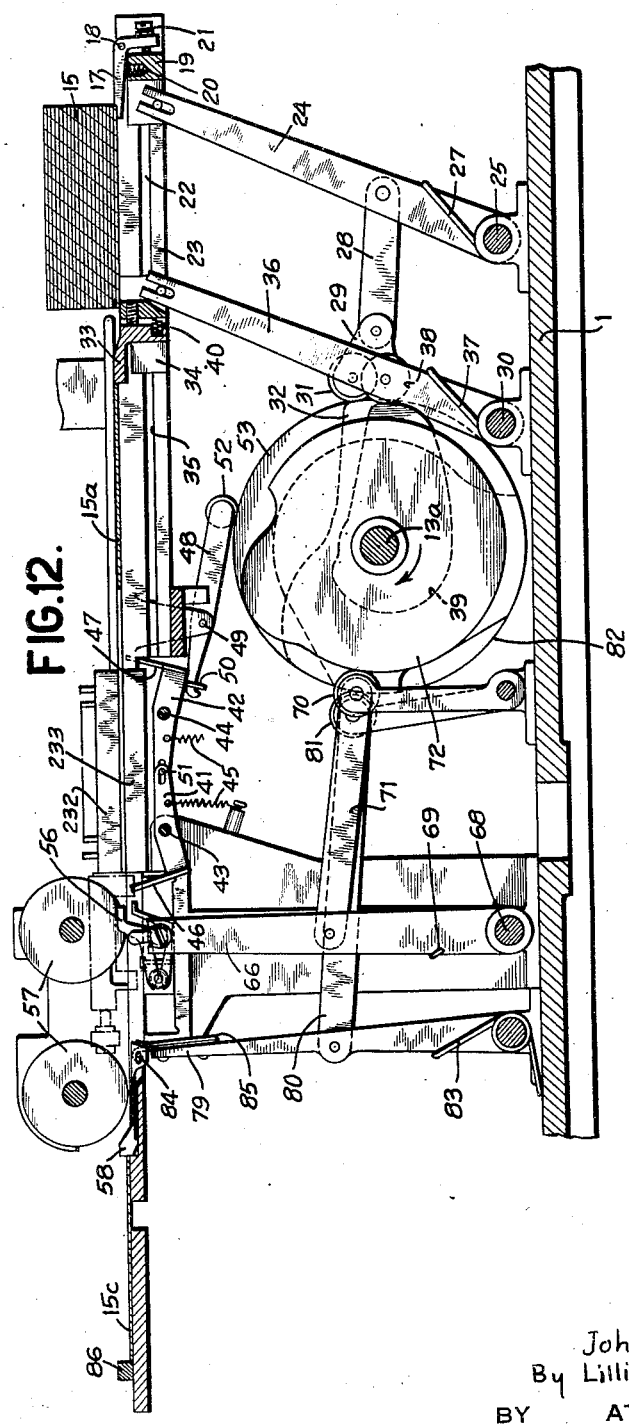
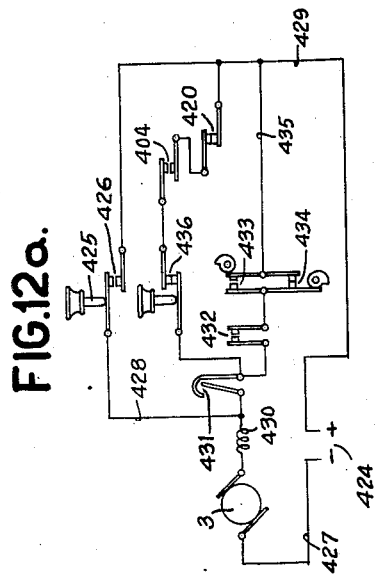
INVENTOR
John T. Schaaff, Deceased,
By Lillian A. Schaaff, Executrix.
BY   ATTORNEY

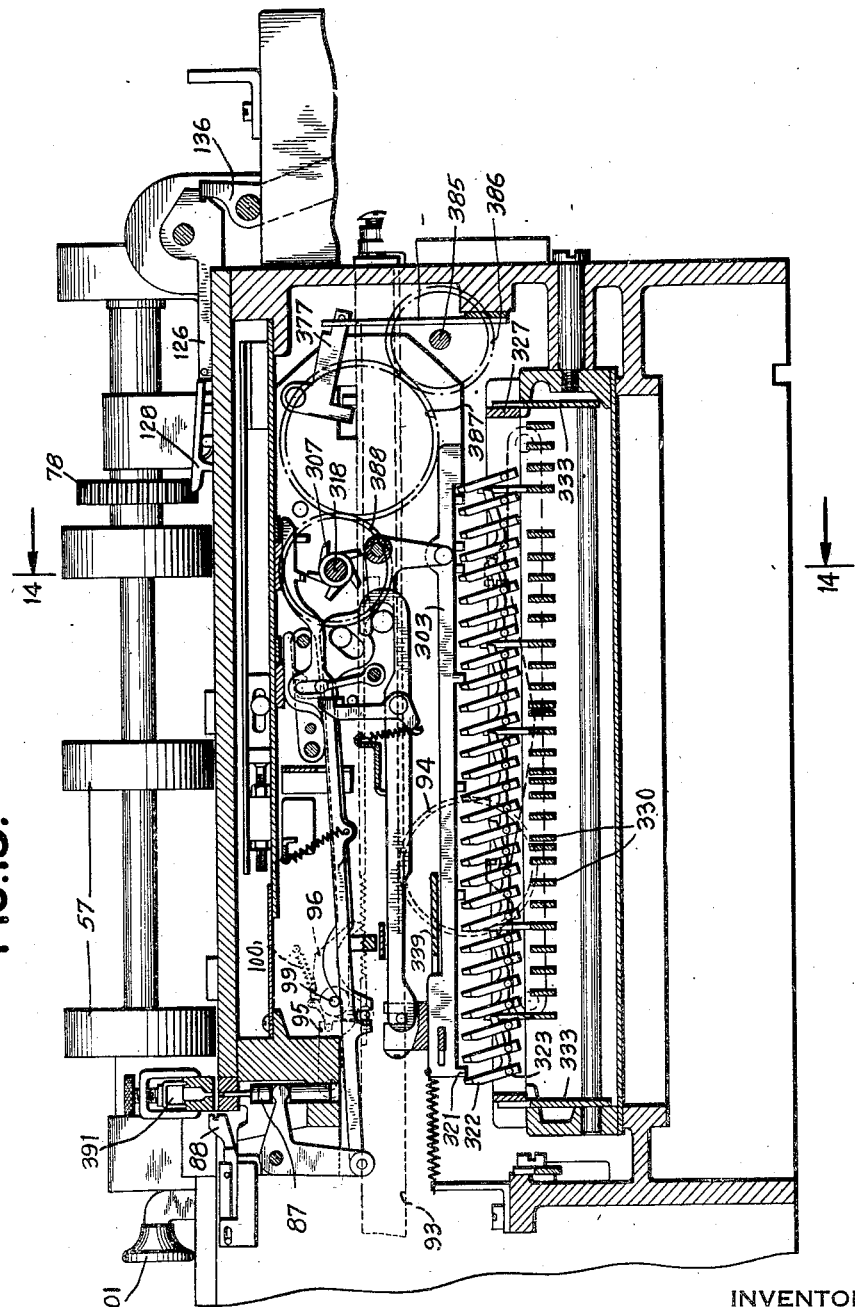

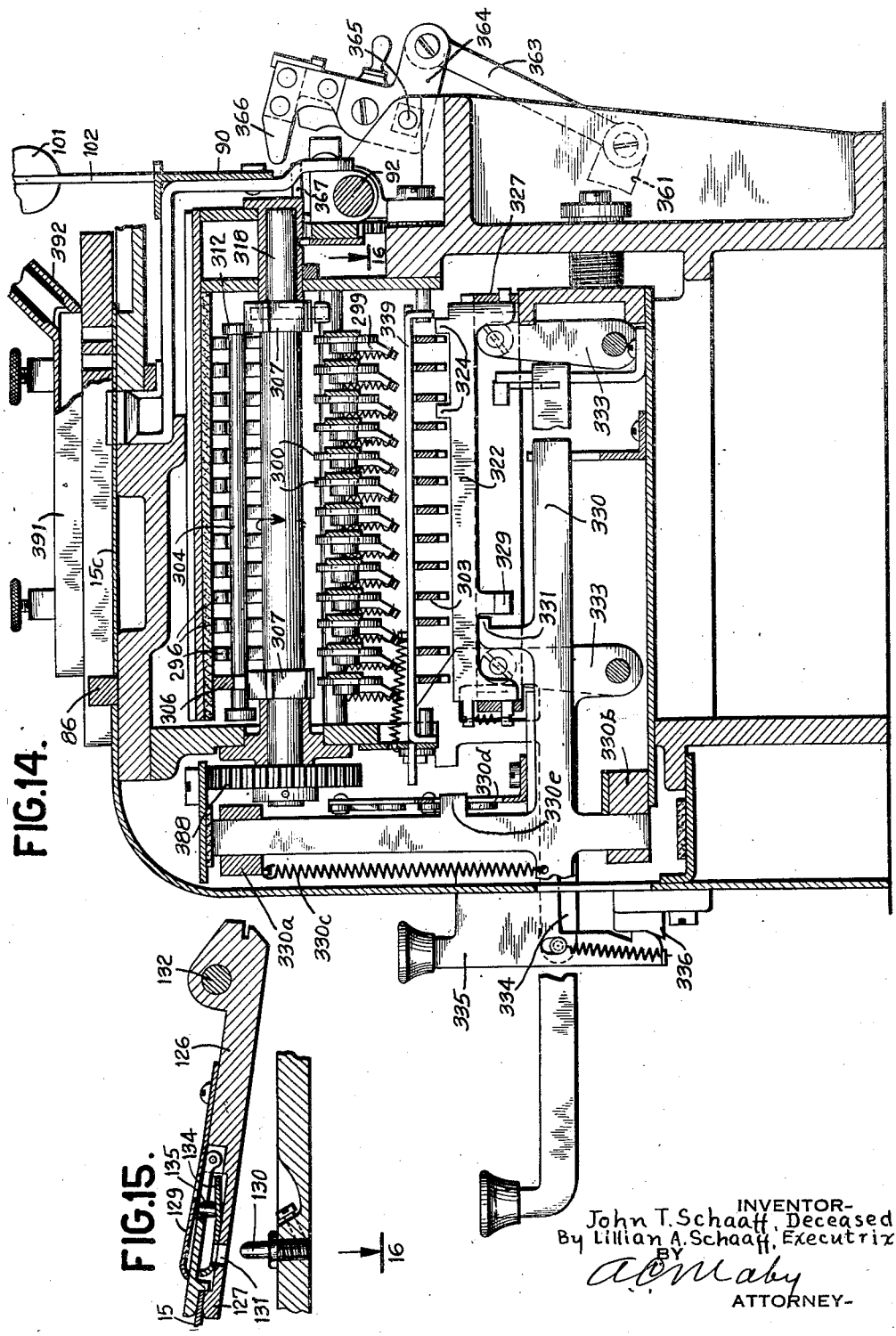

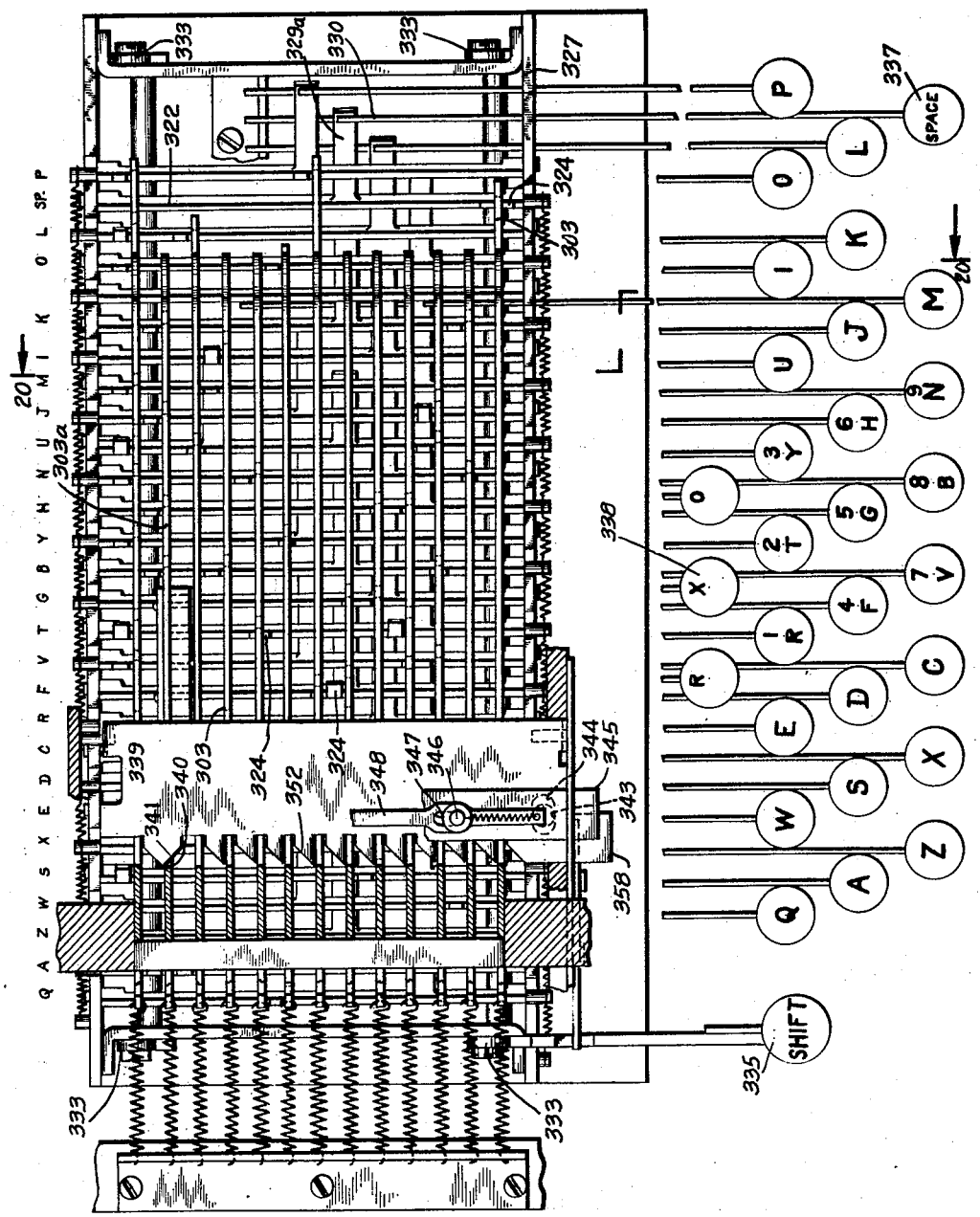

Feb. 11, 1936. J. T. SCHAAFF 2,030,405
RECORD PERFORATING MACHINE
Filed March 21, 1934 22 Sheets-Sheet 13
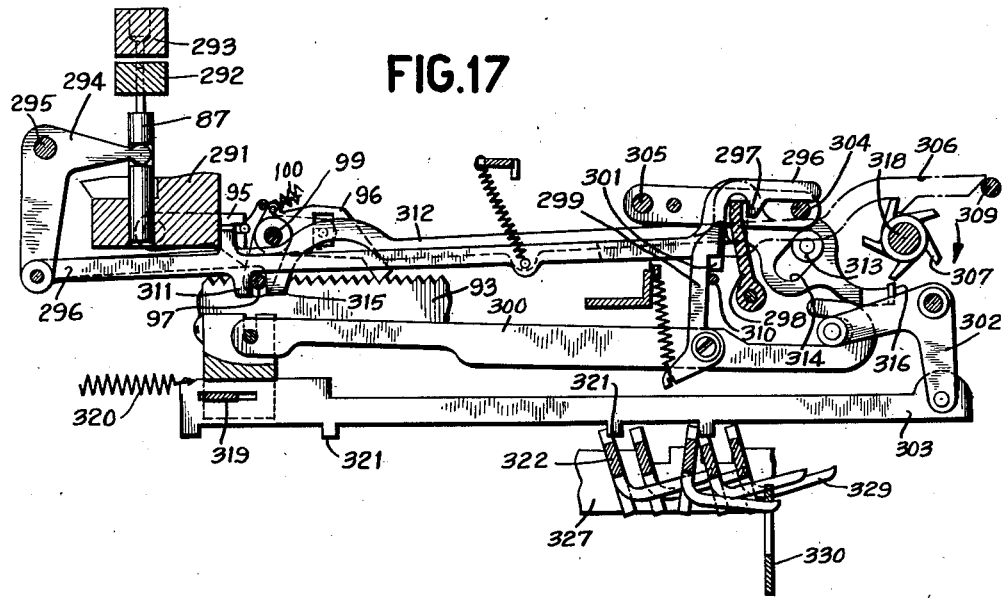
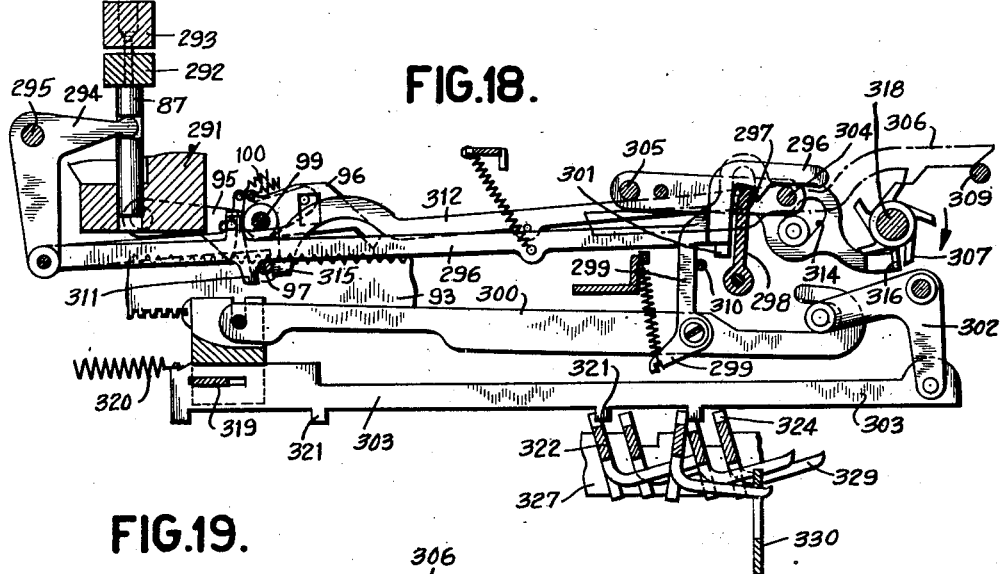
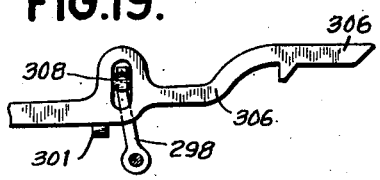
INVENTOR-
John T. Schaaff, Deceased,
By Lillian A. Schaaff, Executrix.
BY
ATTORNEY Feb. 11, 1936.  J. T. SCHAAFF  2,030,405
RECORD PERFORATING MACHINE
Filed March 21, 1934  22 Sheets-Sheet 14
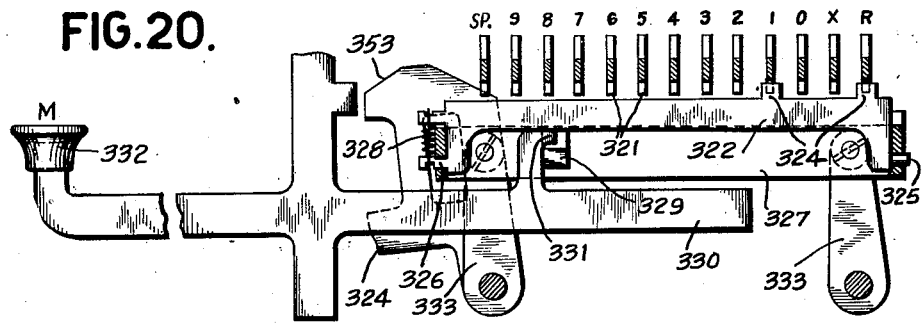
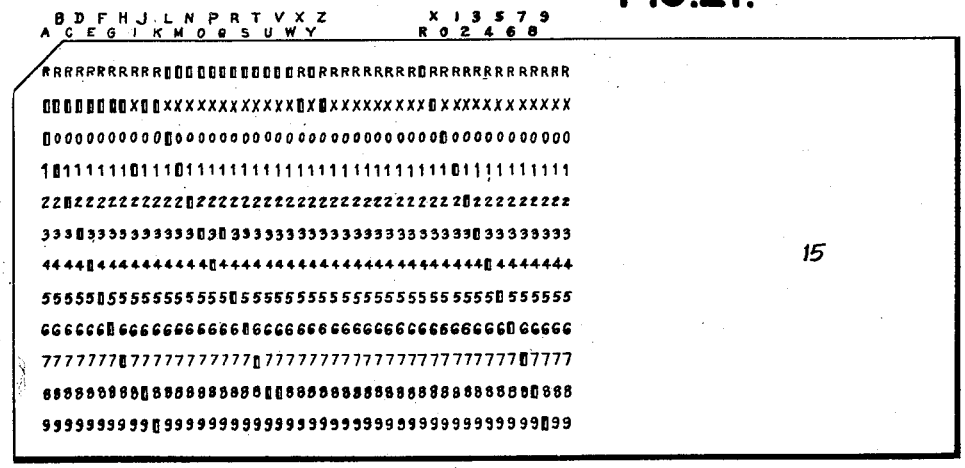
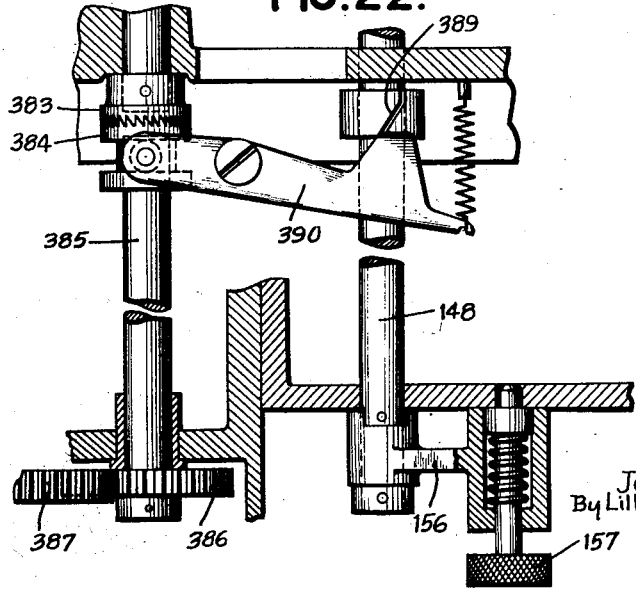
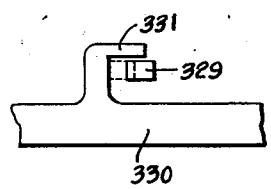

Feb. 11, 1936.                J. T. SCHAAFF                2,030,405
                         RECORD PERFORATING MACHINE
                        Filed March 21, 1934        22 Sheets-Sheet 15
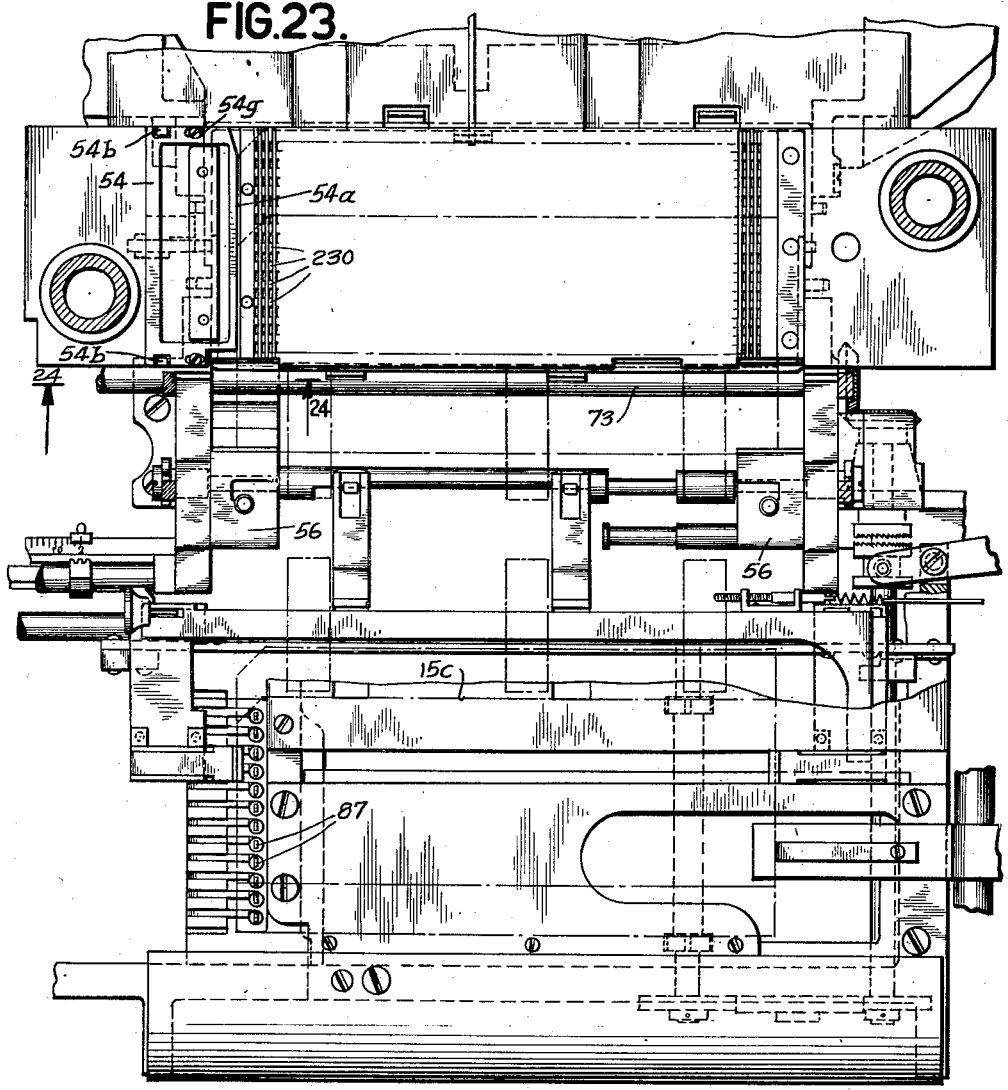
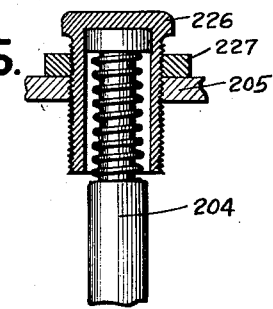
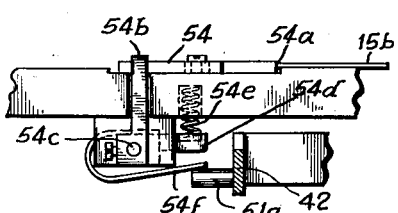
INVENTOR-
John T. Schaaff, Deceased,
By Lillian A. Schaaff, Executrix,
BY
A. C. Maby
ATTORNEY- Feb. 11, 1936.  J. T. SCHAAFF  2,030,405
RECORD PERFORATING MACHINE
Filed March 21, 1934  22 Sheets-Sheet 16
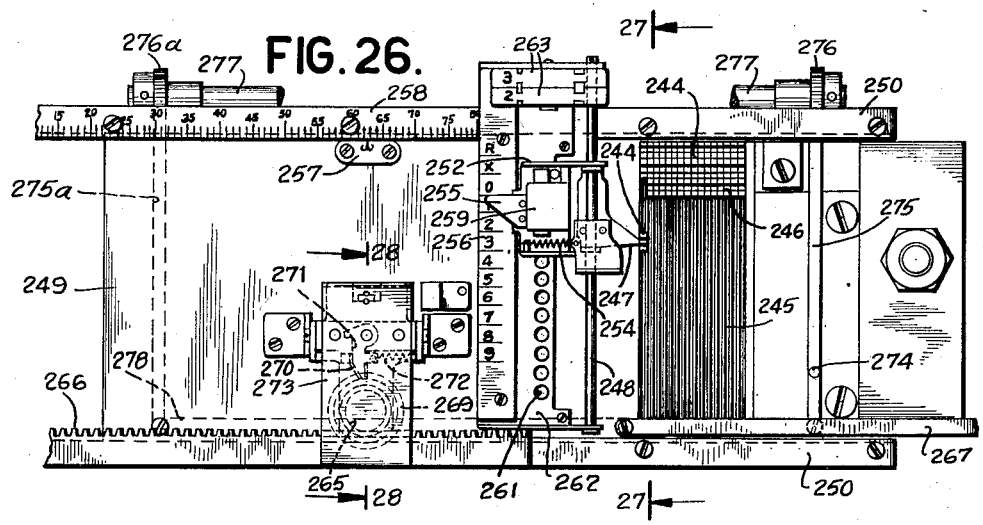
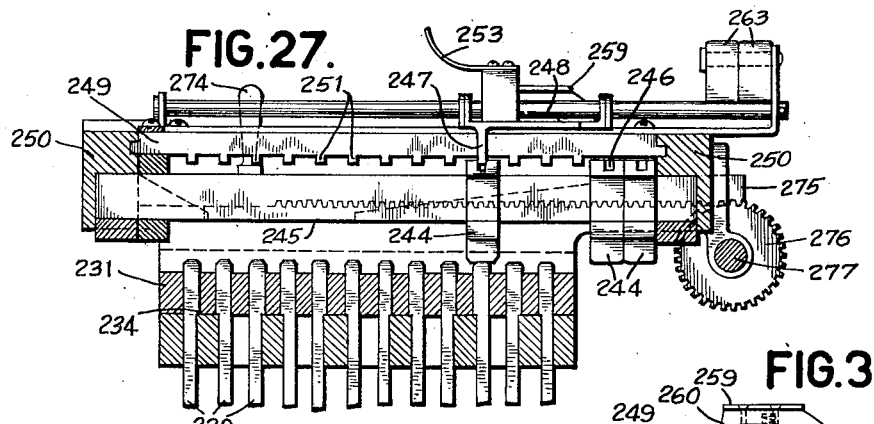
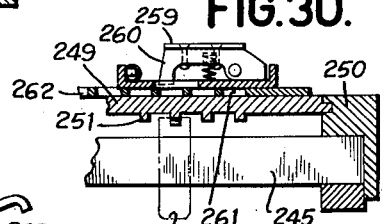
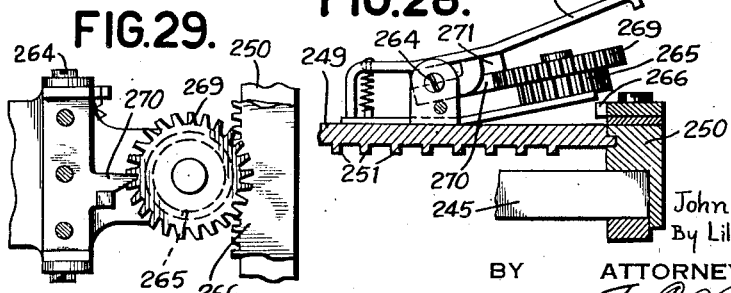
INVENTOR
John T. Schaaff, Deceased,
By Lillian A. Schaaff, Executrix.
BY  ATTORNEY
A. C. Maby Feb. 11, 1936. J. T. SCHAAFF 2,030,405
RECORD PERFORATING MACHINE
Filed March 21, 1934 22 Sheets-Sheet 17

INVENTOR-
John T. Schaaff, Deceased,
By Lillian A. Schadff, Executrix,
BY
ATTORNEY-

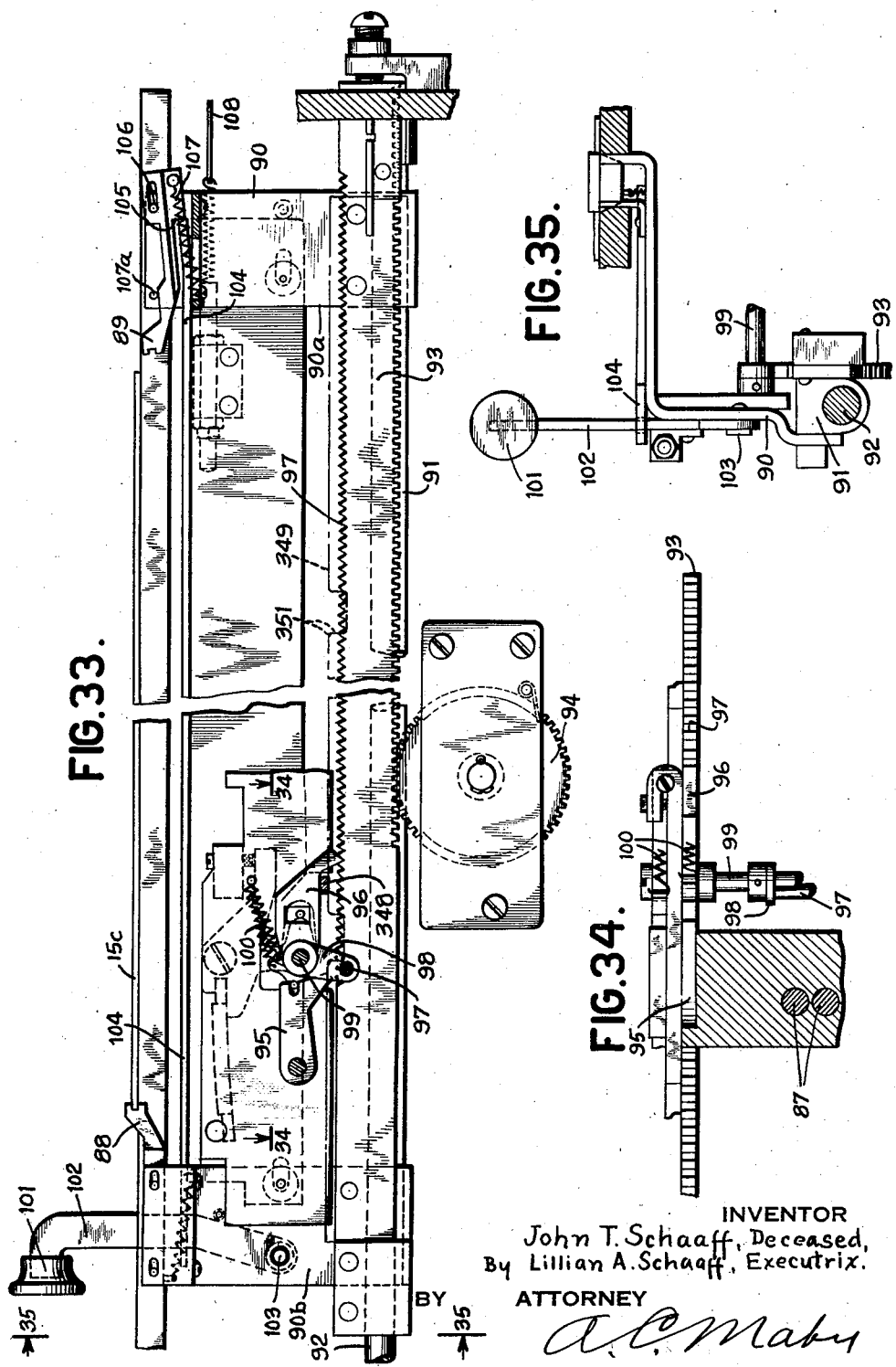

Feb. 11, 1936.  J. T. SCHAAFF  2,030,405
RECORD PERFORATING MACHINE
Filed March 21, 1934   22 Sheets-Sheet 19

INVENTOR-
John T. Schaaff,
Deceased,
BY Lillian A. Schaaff,
Executrix.

BY A. C. Maby ATTORNEY-

Feb. 11, 1936.  J. T. SCHAAFF  2,030,405
RECORD PERFORATING MACHINE
Filed March 21, 1934   22 Sheets-Sheet 20

INVENTOR-
John T. Schaaff, Deceased,
By Lillian A. Schaaff, Executrix
BY
ATTORNEY- Feb. 11, 1936.    J. T. SCHAAFF    2,030,405
RECORD PERFORATING MACHINE
Filed March 21, 1934    22 Sheets-Sheet 21

INVENTOR
John T. Schaaff,
Deceased,
By Lillian A. Schaaff, Executrix
BY
*A. C. Maby*
ATTORNEY Feb. 11, 1936. J. T. SCHAAFF 2,030,405
RECORD PERFORATING MACHINE
Filed March 21, 1934 22 Sheets-Sheet 22

INVENTOR
John T. Schaaff.
Deceased
By Lillian A. Schaaff.
Executrix.
BY
A.C. Maby
ATTORNEY Patented Feb. 11, 1936

2,030,405

UNITED STATES PATENT OFFICE 2,030,405

RECORD PERFORATING MACHINE

John T. Schaaff, deceased, late of Washington, D. C., by Lillian A. Schaaff, executrix, Washington, D. C., assignor to International Business Machines Corporation, New York, N. Y., a corporation of New York Application March 21, 1934, Serial No. 716,580

19 Claims. (Cl. 164—112)

This invention relates to record perforating machines for punching records for use in controlling accounting machines, such as, sorting and tabulating machines.

The cards used in such machines are divided into a plurality of columns, and entries are made by punching holes in definite positions in each of the columns. According to the Hollerith system, the columns are divided into ten index positions or points ranging in values from zero to nine, and a perforation is made at any one of these ten positions to represent the corresponding value. Two additional positions are provided for additional data.

According to the Peirce system a smaller number of index positions is employed in each column and combinations of differently arranged perforations are used to represent different values. In the Peirce system, four index positions are provided for the numerals and one perforation or a combination of two perforations are used to represent each digit. Where the letters of the alphabet are also to be represented according to the Peirce system, six index positions are employed and single perforations or combinations of two or more in each column are used to represent the characters.

In order to represent the letters of the alphabet in the columns of the Hollerith card a single perforation may be used up to the capacity of the column, to represent part of the alphabet; then combinations of two perforations may be employed to represent additional characters.

The present machine may be employed for punching record cards in accordance with these and other systems and is described here in connection with the Hollerith type of card in which a single hole or combinations of several holes may be punched in each of the twelve point columns.

It is often necessary when punching these record cards to make date or other designation entries, by which the cards of particular groups can be distinguished. In such case the same entry is made in certain columns of the card on a large number of the cards. In such cases, time is saved by gang punching such cards. This may be done by setting up a special machine to punch all of the cards alike in such columns and by punching the cards in those columns before the rest of the data is entered.

It is sometimes desirable also to print serial numbers on the cards.

One of the objects of the present invention is to devise a perforating machine in which the record cards are automatically fed into position for punching the entries and in which the gang punching is effected as the card is being fed from the supply hopper to the regular punching position.

Another object is to devise mechanism for printing the serial numbers on the cards as they are fed in.

Another object is to devise a serial numbering device which may be adjusted so that the printing of the serial numbers may be done in any of several positions.

Another object is to provide means whereby the machine may be used for serially numbering the cards only, or for gang punching and serially numbering them and in each case causing them to be fed out to a receiving hopper without intervening manual operations.

Referring to the drawings wherein is shown what is considered to be the preferred form of the invention:

Fig. 4 is a section taken on line 4—4 of Fig. 3 showing portions of the serial numbering mechanism and the driving mechanism for the machine;

Fig. 5 is a section taken substantially on the line 5—5 of Fig. 1 and showing the gang punching section;

Fig. 6 is a detail of the card carriage restoring mechanism shown in Fig. 3;

Fig. 7 is a section taken on line 7—7 of Fig. 1 showing the details of the gang punching mechanisms;

Fig. 8 is a sectional detail of a clutch taken on line 8—8 of Fig. 7;

Fig. 9 is a section taken on line 9—9 of Fig. 1 showing parts of the card feeding, serial numbering, gang punching and hand punching mechanism;

Fig. 10 is a detail of means for removing the card from the machine after it has been completely punched;

Fig. 11 is a section taken on line 11—11 of Fig. 1 showing gang punching mechanism and means for operating the serial numbering mechanism;

Fig. 12 is a detail of portions showing a section of the card feeding means for feeding the card from the supply hopper to the serial numbering position, the gang punching position and the beginning of the hand punching position;

Fig. 12a is a circuit diagram of the electrical driving and control mechanism;

Fig. 13 is a section taken on line 13—13 of Fig. 1 showing some of the hand punching mechanism;

Fig. 14 is a section taken on line 14—14 of Fig. 13;

Fig. 15 is a detail of means for taking the card out of the hand punching position;

Fig. 16 is a section taken on line 16—16 of Fig. 14 showing the manner in which the keys control the operation of one or more of the hand operated punches;

Fig. 17 is a detail of the hand punches;

Fig. 18 is a detail similar to Fig. 17 with the parts in different position;

Fig. 19 is a detail of the hand punch control mechanism;

Fig. 20 is a sectional detail of the hand punch selecting mechanism, taken on line 20—20 of Fig. 16;

Fig. 20a is a detail of a punch selecting lug;

Fig. 21 shows a record card punched in accordance with the design of the present machine;

Fig. 22 is a detail of the hand punch clutch mechanism;

Fig. 23 is a plan view with parts shown in section, including the gang punching station and the hand punching station and feeding means for feeding the card from one station to the other;

Fig. 24 is a sectional detail taken on line 24—24 of Fig. 23 showing card adjusting or registering means;

Fig. 25 is a sectional detail of part of the serial numbering mechanism;

Fig. 26 is a detail plan view of the gang punching section showing the manner in which the setting is effected;

Fig. 27 is a sectional detail taken on line 27—27 of Fig. 26 showing the setting means;

Fig. 28 is a sectional detail taken on line 28—28 of Fig. 26 of means for advancing the setting carriage;

Fig. 29 is a plan view of the mechanism shown in Fig. 28, partly in section;

Fig. 30 is a sectional detail of the setting mechanisms shown in Fig. 27;

Fig. 33 is a detail of the hand punch carriage and escapement mechanism;

Fig. 34 is a section taken on line 34—34 of Fig. 33;

Fig. 35 is a section taken on line 35—35 of Fig. 33;

*Main drive*

Figure 1:
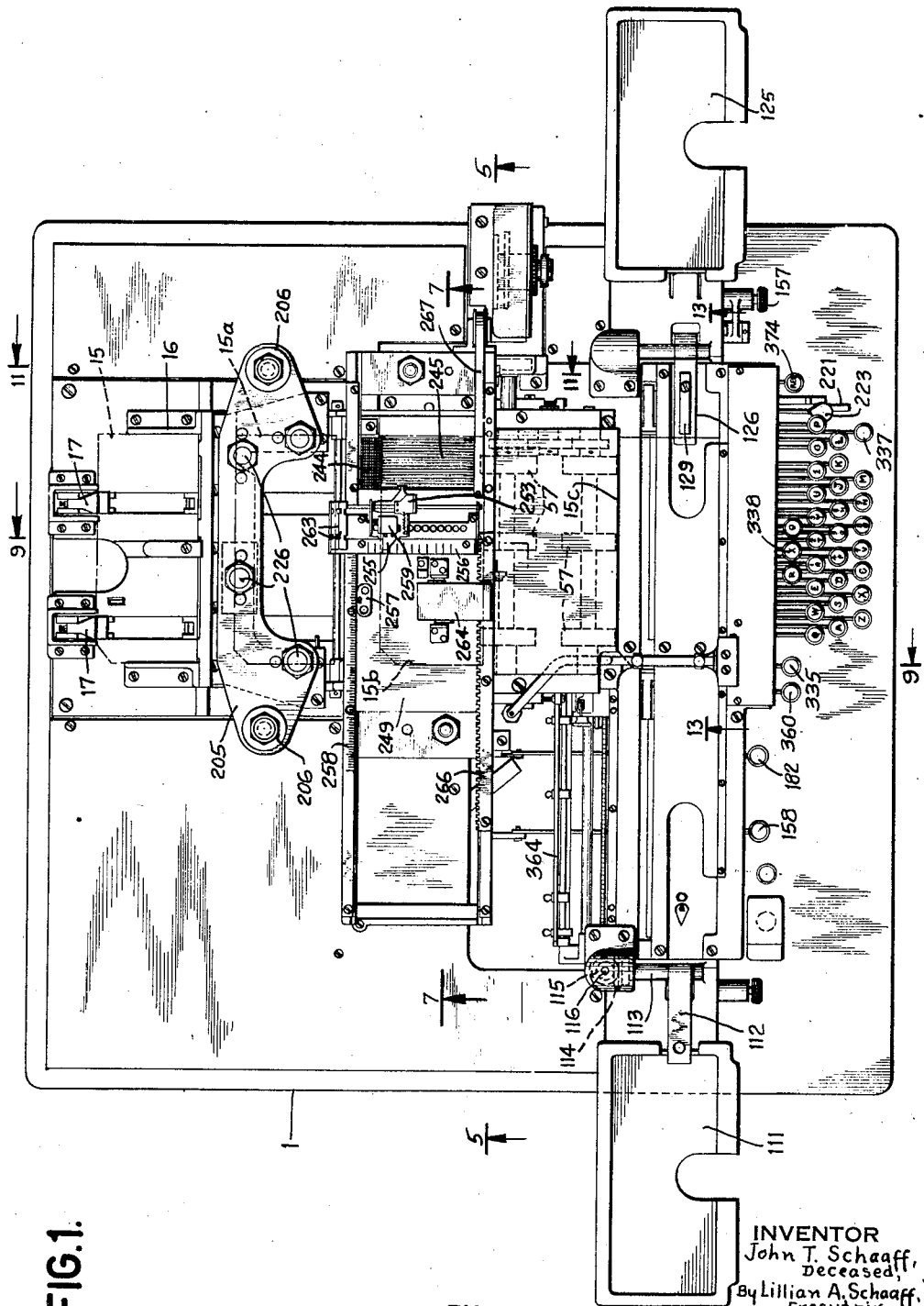
Fig. 1 is a plan view of the machine.
Figure 2:
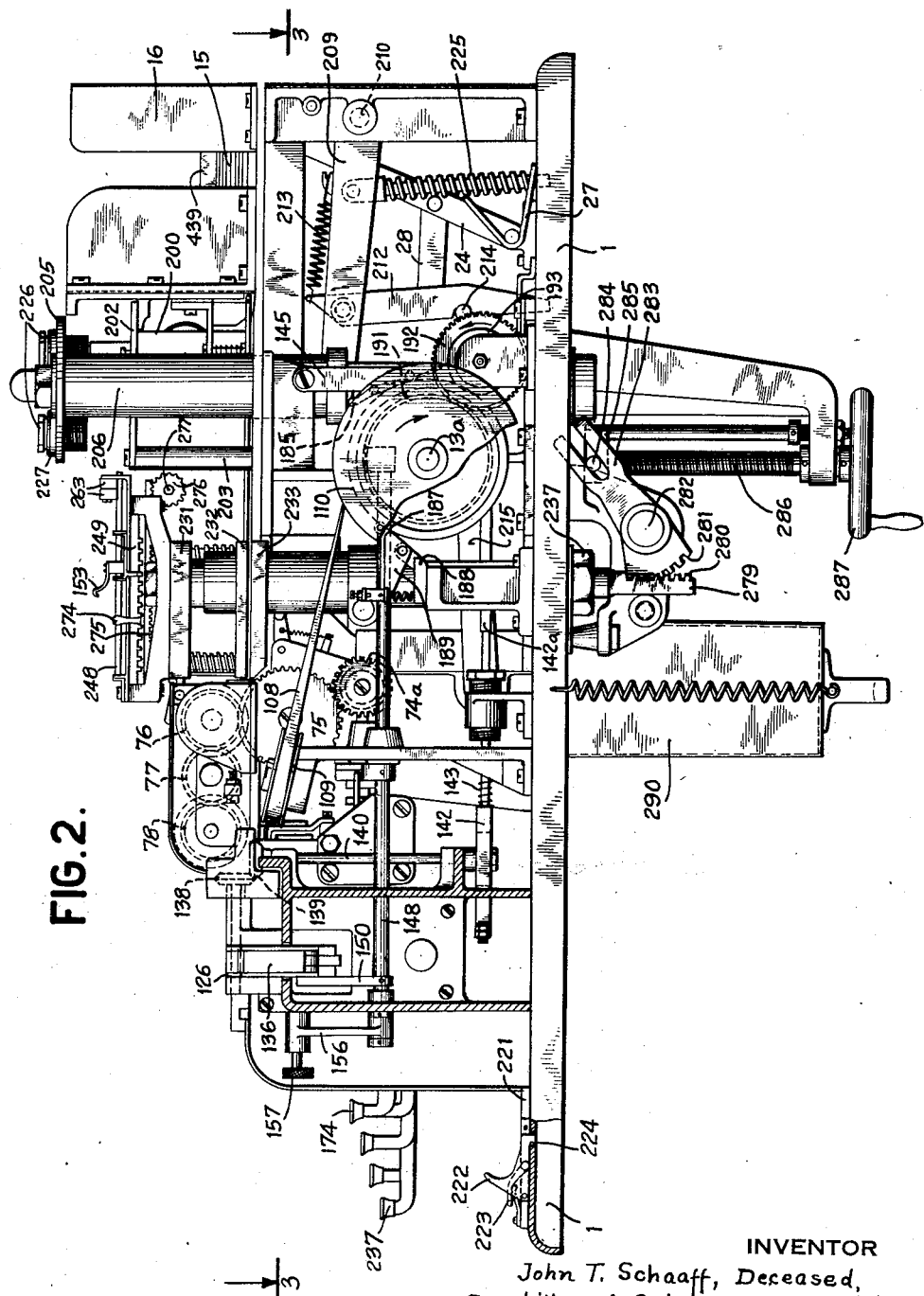
Fig. 2 is an elevation of the machine viewed from the right side of Fig. 1, omitting the stand for supporting the machine.
Figure 3:
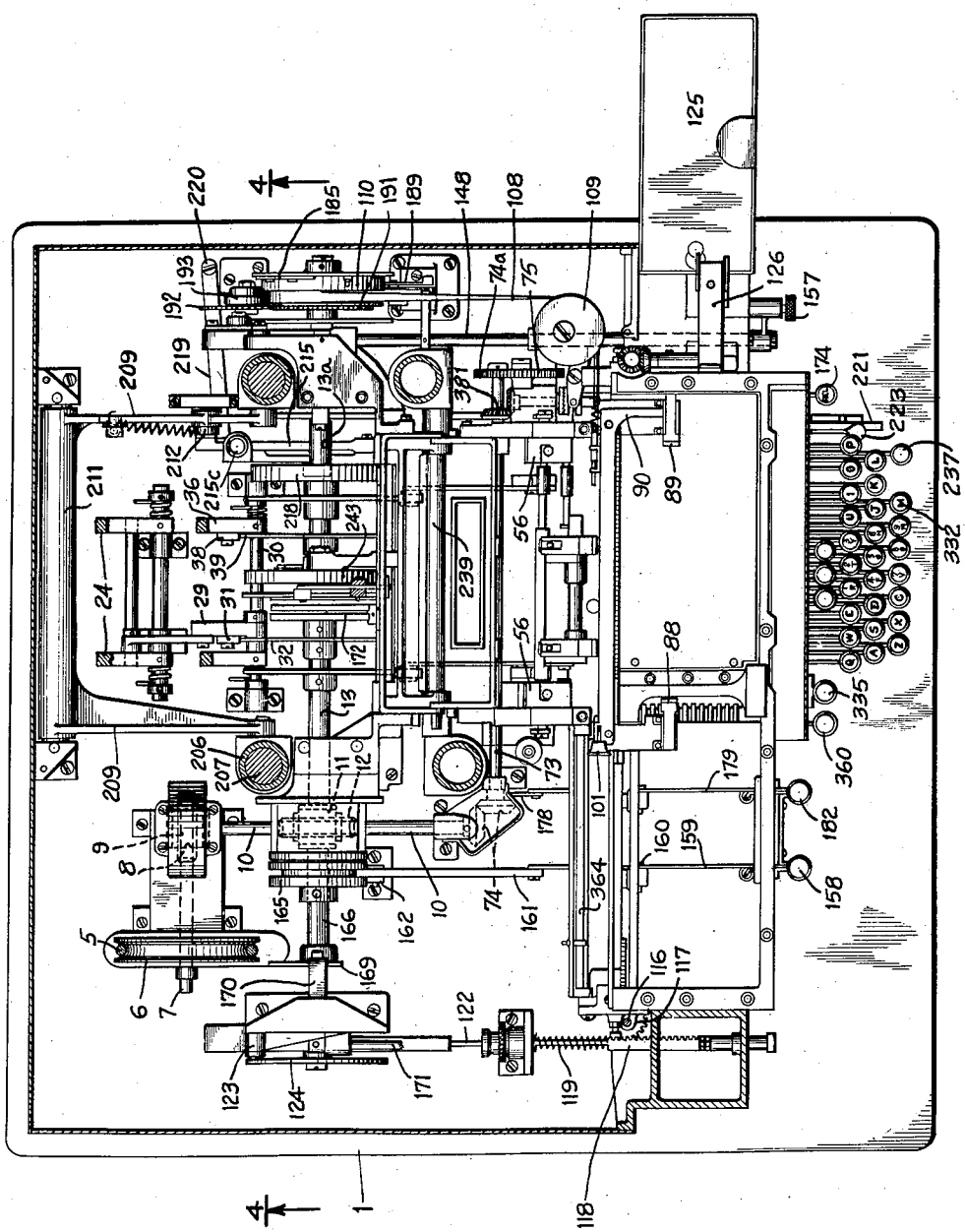
Fig. 3 is a sectional plan view taken substantially on line 3—3 of Fig. 2.

Referring to Figs. 1, 2, 3, 4, and Fig. 46, the machine includes a bed plate 1 mounted on legs 2. An electric motor 3 mounted below the bed plate is provided with a pulley 4 on which is a belt 5. This belt runs upwardly through the bed plate and over a pulley 6 mounted on a shaft 7 (Figs. 3, 4). Shaft 7 is provided with a worm 8 meshing with the worm wheel 9 on a shaft 10. Shaft 10 in turn has a worm 11 (Fig. 7) meshing with a worm wheel 12 on the main drive shaft 13 which drives the cam shaft 13a carrying operating cams for operating various parts of the machine.

Shaft 13 is normally running and shaft 13a may be caused to operate by clutching it to shaft 13. The clutch is shown in Figs. 3, 5 and 7 and comprises a clutch disc 172 fixed on shaft 13 and a grooved disc 173 fixed on shaft 13a and a pin 174. A spring 175 moves the pin to clutching position, while lever 176 is adapted to restore it to normal position. Lever arm 176 is fixed on a rod 177 (Figs. 7 and 9) which has an arm 178 fixed on its other end. A key lever 179 pivoted at 180 connects with arm 178 by pin and slot 181 and has a key 182. Arm 176 is adapted to cam pin 174 to the right in Fig. 7, out of engagement with clutch disc 172 to stop the turning of shaft 13a. To cause shaft 13a to turn one revolution, key 182 will be depressed and permitted to rise again under the influence of its spring 183. This will release the clutch pin 174, permitting it to engage in the disc 172. At the end of the revolution the pin will be cammed out and shaft 13a stopped. If it is desired to cause shaft 13a to run continuously, key 182 may be depressed and latched down to a projection 184.

*The card feed*

The cards 15 which are to be punched are stacked in the hopper 16. They are fed one at a time from the bottom of the stack to the position 15a, and while in this position a serial number is printed on them. The mechanism for feeding the card to this position includes a pair of card pickers 17 (Figs. 1, 9 and 12) pivoted at 18 to a block 19 and actuated by a spring 20 upwardly into cooperation with the cards. An adjusting screw 21 may be provided to fix the upward limit of movement of the picker. The block or blocks 19 are slidable back and forth in grooves 22 in the frame 23 and are connected by pin and slot to arms 24 pivoted at 25 to the plate 1. The spring or springs 27 may serve to move the card pickers to the left as viewed in Fig. 12. A link 28 (Figs. 9 and 12) is connected to a rocker arm 29 which is loose on shaft 30. This arm is provided with a cam follower 31 cooperating with a cam 32 on the main cam shaft 13a. This serves to restore the card pickers to the right.

After the serial number has been printed on the card in the position 15a the card is fed to the next station at 15b (Fig. 1). In the position 15b gang punching is effected, i. e., the machine is set up to punch holes in various columns on the cards to represent certain data common to a large number of cards. These numbers will be punched in all of the cards fed through the machine until the set up is manually changed. When a card is being fed from the serial number position 15a to the gang punching position 15b a new card is being fed from the hopper 16 to the serial number position 15a.

The mechanism for feeding the card from the position 15a to the position 15b includes a pair of pushers 33 (Fig. 12) carried by a block 34 slidable in grooves 35 in the frame member 23. The block 34 is connected by pin and slot to a pair of arms 36 fixed on the shaft 30. Springs 37 may be provided to rock the arms to the left as viewed in Fig. 12 to move the card from the positions 15a to the position 15b. One of the arms 36 has a cam follower 38 cooperating with the cam 39 on the shaft 13a. This serves to restore the pushers 33 to the right. The spring 40 holds the pushers in position back of the card while they are feeding the card to the left and permits the pushers to be cammed downwardly by the card when the arms 36 restore the pushers toward the right. The springs then cause the pushers to snap up behind the next card ready to feed it.

When the card is punched to position 15b it is necessary that it be accurately adjusted, so that the punching will take place in the exact positions or index points in order to clearly represent data, so that the subsequent reading of the perforations in tabulating or sorting or other machines may be accurately effected. The means for registering the card in this position includes arms 41, 42 (Figs. 11, 12) pivoted at 43, 44 and provided with springs 45. The arms 41, 42 carry stops 46, 47. The springs 45 are adapted to rock the arms so as to raise the stops 46, 47 into cooperation with the front and rear edges of the card after the latter has reached the position 15b. These stops accurately position the card ready for punching. The stops will be lowered by means of a cam follower arm 48 pivoted at 49 to a bracket and connected at 50 to one of the arms 42. By reason of pin and slot connection 51 the lowering of one of the stops will effect lowering of the other. Arm 48 has a follower 52 cooperating with a cam 53 on the shaft 13a.

When in the positions 15a and 15b the card is held against lateral displacement by guide rails such as rail 55 (see Fig. 7). At this point it may be stated that in the serial numbering position it is not necessary to register the card as accurately as in the punching position, and means for registering the leading edge and the rear edge of the card in that position may be omitted. Means is also provided to accurately register the card endwise when in the gang punching position. This is shown as a frame 54 (Figs. 23, 24) the inner edge 54a of which is adapted to press the card into position. Two fingers 54b engage in notches in the ends of the plate. These fingers are fixed on a rod 54c on which is also fixed an arm 54d. A spring 54e rocks the fingers to move the plate to the right against the card, while a spring 54f fixed to arm 54d is adapted to be engaged by pin 51a of arms 41, 42 (Fig. 12), when the latter are rocked to inoperative position. When the card has entered and the fingers 46, 47 are operated to register it, plate 54 will operate against the card. The plate is slidably mounted by screws or pins 54g in slots in the plate.

After the card has been punched in the position 15b it will then be fed to the position 15c. In the latter position hand punching is started. This is done column by column in the manner commonly employed in the well-known Hollerith card punches, i. e., a single column of 12 punches is provided and whenever a punch is actuated to punch a hole through a column in the card the card then escapes to present the next adjacent column in line with the punches. The mechanism for feeding the card from the position 15b to position 15c includes card clips 56, feed rollers 57 and pushers 58 (Fig. 12).

Clips 56 are shown in Figs. 3, 9, 11, 12 and 23. These clips are fully disclosed in U. S. Patent No. 1,817,631 and comprise upper and lower jaws carried on a block 59 moving back and forth in a groove 60. The jaws are adapted to be closed by a spring, not shown here, to grip the card and then move it toward the left from the position 15b. A camming device having an arm 61 controls the opening and closing of the clips. As the jaws move to the right the arm 61 strikes the right hand end of the member 62 causing the arm 61 to rock counterclockwise to permit the jaws to close upon the card. Then when the clips move to the left, the arm 61 eventually strikes the left hand projection on member 62 and rocks clockwise causing the jaws to open to release the card. The member 62 is carried by screws 63 cooperating with slots 64 and may be adjusted by an adjustment screw 65 so as to determine the exact point at which the clips will close upon the card. The operation of the block 59 is effected by arms 66 connected thereto at 67 and pivoted at 68. A spring 69 moves the arm 66 to the right. A cam follower 70 on a link 71 connected to the arm 66 cooperates with cam 72 and serves to move the clips to the left. These clips serve merely to take the card from the position 15b and feed it to the rollers 57. The rollers then carry it almost to the position 15c and the pushers 58 move it into position. The rollers 57 are operated through a shaft 73 (Fig. 3) connected by beveled gears 74 to the shaft 10. Shaft 73 has a gear 74a meshing with the gear 75 (see also Fig. 2). Gear 75 in turn meshes with a gear 76 and through an idler 77 also drives gear 78. Gears 76 and 78 are fixed with respect to the feed rolls 57 and thus turn the latter. The pushers 58 are carried by an arm 79 connected by a link 80 to a cam follower 81 cooperating with a cam 82.

A spring 83 moves the pushers toward the right and the cam 82 moves them to the left with the card. The pushers are connected to the arms 79 by pin and slot connection as at 84, and a spring 85 is provided to yield when the card strikes the guide rail 86. The card is then in position 15c, (Figs. 1 and 12) with its first column lying directly below and in register with a set of punches 87.

The card will now be fed column-by-column to the left whenever a perforation is made in the column then in position. This feeding is effected as follows. In the position 15c the two ends of the card are held by clips 88, 89, (Figs. 3, 13, 33). These clips are mounted on a card carriage 90. This carriage comprises portions 90a and 90b attached to a member 91 which is slidably mounted on a rod 92. The escapement member 93 is also fixed to the carriage and meshes with a gear 94 which is operated by a spring controlled drum which tends to urge the carriage toward the left as viewed in Fig. 33. A pair of escapement pawls 95, 96 cooperate with ratchet teeth 97, in the upper edge of the rack bar 93. Whenever a punch is actuated to punch a hole in the column then in registration with the punches 87, a rod 97 is moved to the right by means to be described later. This rod, or bail, through the arms 98, rocks the shaft 99 counterclockwise. This in turn lowers the pawl 95 into cooperation with the ratchet teeth and lifts the pawl 96 out. Then when the punch is released the shaft 99 turns clockwise back to its normal position while the spring 100 lifts the pawl 95 out of the rack and restores the pawl 96. During this cycle of operations the carriage moves one step or column to the left to present the next column of the card in position with respect to punches 87 shown in Fig. 23.

After the card carriage 90 has reached the end of its travel toward the left, it may be restored toward the right manually by pushing the button 101 in that direction. This button is carried by a stem 102 pivoted at 103 to the carriage. The stem 102 reaches upwardly through a flat rod 104 and moves the latter slightly toward the right in Fig. 33. In this way the right end of the rod 104 engages the shoulder 105 on the card clip 89, moving the latter toward the right on its pin and slot mounting 106, against the action of its spring 107. This causes a pin 107a to cam the clip downwardly out of the plane of the new card which is being fed at right angles thereto into the position 15c. When the key 101 is released the spring 107 will move the clip 89 back toward the left to cooperate with the new card.

The carriage may also be restored toward the right by power. For this purpose a tape 108 is connected to the right hand end of the carriage 90. This tape passes around the drum 109 (Figs. 2 and 3) and is connected to a drum 110 associated with the shaft 13a. The manner in which this drum 110 is operated to restore the carriage is as follows: When the clutch key 182 is depressed causing shaft 13a to turn, as more fully described elsewhere herein, a pawl 185 (Figs. 2, 3 and 6) carried by disc 186 fixed on shaft 13a, will engage in a notch 187 in the drum 110 which is loose on the shaft. This will cause the drum to rotate with the shaft and wind in tape 108 to draw the card carriage to the right. When the carriage reaches its home position, the rear end of the restoring pawl 185 will engage a shoulder 188 (Fig. 2) and be lifted out of engagement with the drum 110. A spring pressed pawl 189 (Figs. 2, 3, 5 and 6) will cooperate with the notch 187 when pawl 185 is lifted out, to prevent the tape drum from jumping backward.

Then, just as shaft 13a reaches its stopping position a pin 190 carried by disc 186 will engage pawl 189 and lift it out of engagement with the drum so that the latter can turn backward as the card carriage feeds to the left while hand punching cards. Fixed to the tape drum is a gear 191 meshing with a gear 192 associated with a governor device 193. This will prevent the carriage from moving too rapidly when it is released to skip a number of columns that are not to be punched during the hand punching operations.

Figures 31, 32:
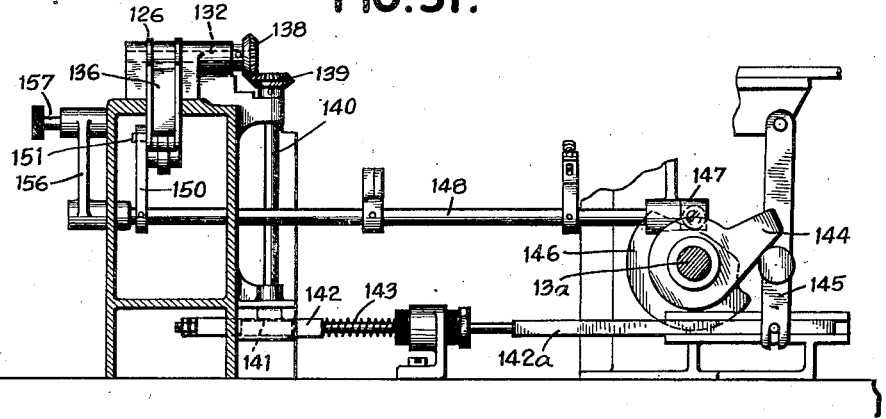
Fig. 31 is a detail of mechanism for removing the card from the hand punching carriage.
Fig. 32 is a detail of mechanism for removing a card from the hand punching carriage when the carriage is in its right hand position and no hand punching is to be effected.

Adjacent to the pawl 189 is a second pawl 194, spring-pressed into cooperation with the drum 110. When the machine is being used for hand punching and shaft 148 is locked in the position of Figs. 3 and 22, an arm 195 carried by shaft 148 will hold the pawl 194 out of engagement with the drum. But when shaft 148 is in the position of Fig. 32 for gang punching or serial numbering of cards without hand punching, pawl 194 will be free to engage drum 110 in notch 187. This locks the card carriage in position at the right hand end of the machine.

When the card has reached the end of its travel toward the left after the completion of the operation of the punches 87, it will be deposited in the discharge hopper 111, (Fig. 1). This is effected by clip 112. The manner in which the clip operates is shown in U. S. Patent #1,803,977. The clip 112 is fixed on a shaft 113 and as disclosed in the above patent, is normally in position to receive the card when it reaches the end of its travel toward the left in the carriage 90. The clip then turns approximately 180° to throw the card over into the hopper 111.

The shaft 113 which carries clip 112 has fixed thereon a beveled gear 114 (Fig. 1) meshing with the beveled gear 115 fixed on shaft 116. The lower end of shaft 116 (Figs. 3 and 10) carries a pinion 117 meshing with a rack 118 fixed to a rod 122. The rack may be moved inwardly against the compression of spring 119 and latched in such position. When it is unlatched the spring 119 will restore it to its outer position thus turning the shafts 116 and 113 to operate the clip 112 to throw the card into the hopper 111. The rack 118 may be set and spring 119 compressed by a cam follower 123 connected to rod 122 and cooperating with a cam 124 on shaft 166 which operates only when a card is to be thrown out.

At the end of the hand punching operation, when the card reaches the end of its travel to the left, the operator will depress the key 158 (Fig. 3), rocking a stem 159 pivoted at 160. The stem is connected to an arm 161 which in turn is pivoted at 162, (see also Fig. 7). The inner end 163 acts as a clutch control member cooperating with the clutch pin 164 carried by a clutch member 165 which is fixed to shaft 166. The clutch pin is normally actuated by a spring 167 into cooperation with a cam disk 168 fixed on shaft 13. In its normal position the control member 163 holds the clutch pin 164 out of cooperation with the disk 168. When the key 158 is depressed, member 163 is moved out of cooperation with the pin 164 and permits the spring 167 to press the pin into cooperation with disk 168 so that the shaft 13 will rotate shaft 166. At the end of the revolution, the key 158 having been released the pin 164 will engage the member 163 and be cammed out of clutching position and will be stopped in its normal position. The turning of shaft 166 for one revolution will cause cam 169 (Fig. 3) to rock the follower-arm 170, thus rocking rod 171. This will release the card clip 112 by the operation of mechanisms similar to that associated with the clip 126 which is more fully described.

If the machine is to be used for gang punching or serial numbering of a lot of cards which are not be hand punched in this machine, then the cards may be taken as soon as they reach the position 15c and deposited in the receiving hopper 125. This may be effected by a clip 126 (Figs. 1, 15, 31 and 32). The clip is normally in the position of Figs. 1 and 32 and includes a lower jaw 127 fixed with respect to the main portion 126, and a hinged jaw 128 which may be closed by a spring 129. In the full line position of Fig. 32, a pin 130 cooperates through an opening 131 in the lower jaw (see also Fig. 15) with the upper jaw, holding the latter open so that the card 15 is not gripped by the jaws. As soon as the clip is rotated clockwise by its shaft 132, it will close upon the card and then swing around to the dotted position 126a where it is opened as shown, so that the card can drop into the hopper 125. The clip is opened by a projection 133 having a fixed position and adapted to engage the rear end of a member 134 which is held normally in position by a pin 135 fixed to the clip member 126. When the clip engages the projection 133 it causes the right end of the member 134 (as viewed in Fig. 32) to press downwardly on the pivoted jaw 128, thus causing it to open against the pressure of spring 129. Normally the clip 126 is in full line position of Fig. 32 and is latched in this position by a latch 136 held there by a spring 137. Fixed on the shaft 132 with the clip 126 is a beveled gear 138 (Fig. 31) meshing with a beveled gear 139 fixed on shaft 140. This shaft carries a pinion 141 at its lower end meshing with a rack 142 which is urged toward the left in Fig. 31 by a spring 143.

When the latch 136 releases the clip, the spring 143 rotates to the dotted line position. The parts will then be restored to normal position by a cam 144 on shaft 13a. This cam swings an arm 145 toward the right in Fig. 31 and moves rod 142a which is integral with the rack 142, toward the right. This moves the parts described, rotating shaft 132 counterclockwise in Fig. 32 with clip 126 until it is latched by latch 136. The clip 126 is released to remove the card, by a cam 146 on shaft 13a. This cam cooperates with the cam follower arm 147 fixed on rod 148. As the cam 146 rotates, a spring 149 acting on the arm 147 will cause the rod 148 to rock counterclockwise in Fig. 32 and by pressing arm 150 against a pin 151 will rock the latch arm 136 to release the clip 126, so that it will turn to the dotted position. As the arm 150 continues to move to the left the lost motion connection between arm 136 and an arm 152 will cause the arm 153 to be rocked clockwise about its pivot 154 until its upper end engages the card 15 and positively pushes it out of the clip. The cam 146 thereafter raises the follower arm 147, releasing the latch 136 so that it may cooperate with the clip 126 when the latter is restored and also releasing the link 152 so that the spring 155 may rock the link with the arm 153 back to normal position.

If the cards are to be hand punched after having been gang punched this device for removing them to the pocket 125 will be locked in inoperative position. This is done by means of a crank arm 156 fixed on the rod 148. The arm 156 is rotated to lift the follower arm 147 out of cooperation with the cam 146 and is latched in this position by a spring-pressed plunger 157 (Fig. 22). When the parts are latched in such position the clip 126 remains latched in its normal position and the cam 144 operates without any effect upon the arm 145.

*Serial numbering*

The serial numbering stamp 200 (Fig. 4) may be of any well known make such as the Bates. The frame 201 is fastened to a plate 202 mounted on posts 203 fixed with respect to the machine. A stem 204 is fastened to an operating plate 205 which is carried by sleeves 206 movable up and down on fixed posts 207. Fig. 4 shows the parts in normal position. To print a number on the card in the position 15a, the plate 205 moves downwardly. This causes the type in the numbering device to be pressed into contact with the card to print the number. Whenever the device operates for printing it changes the setting so that the next printing will be of the next higher number. Duplicate or triplicate numbering can, of course, be effected by using numbering units 200 designed for that purpose. The sleeves 206 are provided with pins 208 cooperating with arms 209 pivoted at 210 (see also Figs. 9 and 11). Two arms 209 are integrally connected through member 211 (Fig. 3) so that the operation of one of the arms to raise and lower its sleeve 206 will cause the operation of the other arm. As shown in Fig. 11 one of the arms 209 is connected to a link 212 which in turn is actuated by a spring 213 into pin and slot connection at 214 with a cam follower arm 215 pivoted at 216 and having a follower roller 217 cooperating with the slot in a box cam 218. Whenever the shaft 13a turns one revolution it will cause the numbering device to operate and print the number on the card and to be restored to normal position. The cam 218 depresses the arm 215 and through link 212 operates the arms 209 for this purpose. The numbering device may be rendered ineffective by moving the link 212 to the right in Fig. 11.

A lever 219 pivoted at 220 (Fig. 3) cooperates with the lower end of link 212 and is connected to a link 221 reaching out to the front of the machine as seen in Figs. 1, 2, 3 and 39. The outer end of this link is provided with a hook 222 by which the operator may move the link in and out to push the link 212 out of cooperation with the cam follower arm 215 at 214. This will permit the follower arm to move up and down without operating the printing device. A spring-pressed latch 223 carried by the link 221 is adapted to cooperate with a hole 224 (Fig. 2) in the plate 1 of the machine to lock the printing device out of operation. When the link 212 is locked in inoperative position the spring 225 carried to one of the arms 209 will serve to raise the parts to their normal non-printing position.

The position of the serial number on the cards may be effected in any of several positions by locating the printing stamp 200 in one of the several positions provided for this purpose. As seen in Fig. 4 the plate 205 carries several members 226 located at different positions. As shown in Fig. 25 the member 226 is threaded in the plate 205 and may be adjusted up and down so as to cause the proper pressure. When the plate is in its normal position a locking nut 227 is adapted to lock the member 226 with respect to the plate 205. The stem 204 of the printing stamp may be carried by any of the members 226 depending on the position upon the card where the numbering is to be effected. The frame 201 of the printing device will, of course, be attached in the corresponding position on the fixed plate 202.

While the cam follower roller 217 has been described as carried by arm 215, it is preferably carried by an arm 215a pivoted on arm 215 at 215b at one end and connected at its other end to arm 215 by a spring device 215c. This permits the connections to yield when the printing impression takes place.

*The gang punch*

Above the card, when it is in the position 15b are the punches 230 (Figs. 7, 9, 23). There are 12 of these punches for each of the 80 columns on the card. The punches are supported in an upper plate 231 and guided by an intermediate die plate 232 so as to cooperate with a cutting die plate 233. A shoulder 234 on each of the punches (see Fig. 27) serves to hold the punches in the plate 231 so that the lower ends of the punches lie above the plane of the card when the latter is in the position 15b. Normally, when the card is pressed upwardly against the punches, it will raise all of the punches; but if any of the punches are locked down, then those particular punches will perforate the card. The card lies between the die plates 232 and 233 and may be raised by lifting both of these die plates. For this reason, these two plates are fixed with respect to sleeves 235 (Fig. 7) mounted on hollow posts 236. The posts 236 are screwed into the plate 1 and locked in position by locked nuts 237. Attached to the lower end of each sleeve 235 is a member 238 into which a common shaft or bar 239 has its bearing. A lever frame member 240 is connected at one end to the shaft 239 and pivoted at its opposite ends 241 (see Fig. 11). A follower arm 242 cooperates with a box cam 243 on shaft 13a. The turning of shaft 13a rocks the lever frame 240 about its pivot 241 lifting the shaft, or bar 239 along with the sleeves 234 and in this way lifts the die plates 232, 233 to press the card upwardly against the punches. The die plates will then be immediately restored to their normal position so that the card which has been punched is ready to be fed out and the next card to be punched will be fed in.

The locking of one or more of the punches in each column to effect gang punching is done by moving a stop into position above such punches. These stops are shown at 244 (Figs. 7, 9, 11, 27). As shown in Figs. 11 and 27, there may be three of these stops to each column so that as many as three punches in each column may be locked to punch either one or two or three holes in a column. Normally, all of the stops may occupy a position to the extreme right as shown in Figs. 11 and 27, out of cooperation with all of the punches. In these figures one of the stops is shown in position above one of the punches. The stops 244 are slidably mounted between the supporting guide strips 245 and may be slid along these strips into position above any of the punches. With the stops set in operative position, when the card is raised against all of the punches, the locked punches will perforate the card. Each of the stops 244 has a notch 246 in its upper end and may be moved into operative position by means of a setting hook 247 (see particularly Figs. 26 and 27). This hook is slidably mounted on a rod 248 mounted on a carriage 249 which in turn is slidable in guide members 250 over the tops of all of the punches 230 and stops 244. After the stop or stops for a particular column have been set the carriage may be stepped one column to the right as viewed in Fig. 26 so that the hook 247 will be in position to set the stops of the next column to the right. As the carriage 249 moves to the right, the downwardly projecting ribs 251 will move into the notches 246 of the stops and thus prevent displacement of them. In this way, the stops are set column by column wherever desired and after the setting is completed in the desired columns the carriage may be moved the rest of the way to the right so as to also lock all of the remaining stops 244 which may not have been set, in their inoperative positions so that they may not be accidentally moved into position above any of the punches.

The setting hook 247 is mounted on the rod 248 along with a slide 252 and is adapted to move along the rod with this slide. The hook is provided with a handle 253 and a spring 254. This spring normally rocks the hook out of engagement with the stop 244 when the operator releases the handle 253. Also mounted on the slide 252 is an index 255 cooperating with a scale 256 mounted on a carriage 249. As the slide is moved along the rod 248, the index cooperates with the scale 256 to show the position to which the stop 244 is moved. In the illustration in Fig. 26, the index shows that the stop 244 is in position to effect punching in the zero position of the particular column on the card. An index 257 mounted on the carriage 249 cooperates with a scale 258 to indicate the column in which the setting is being effected. To set one of the stops 244 the operator moves the slides 252 as far back to the left as it will go (see Fig. 26) and then rocks the hook 247 into cooperation with the stop and moves it forward to the desired position. He then presses a button 259 and presses a projection 260 (see Fig. 30) into one of the holes 261 in a plate 262. This will aid in accurately setting the stop 244 so that when the carriage escapes and advances with the ribs 251 one of these ribs will engage the stop in its slot to hold it in position. As shown in Figs. 26 and 27, two abutments 263 are mounted on the carriage 249 and when the slide 252 is moved back until it strikes these abutments, it will be in position to engage only one of the stops 244 of each column. If two of the stops 244 are to be set for punching in each column then one of the abutments 263 will be rocked to inoperative position so that when the slide 252 is moved back it will be in position to engage and move two of the stops 244 to set position. That is, it will engage the middle of the three stops in the column and move this along with another stop into position.

The slide may be moved to a point where the middle stop is in one of the two positions to be punched and then the hook may be raised to release this stop and moved into position to cooperate with the other stop so as to move the latter into position. If three stops 244 are to be set in each column then both of the abutments 263 will be raised out of position and the slide 252 will be permitted to move back to where it will bring out all three of the stops 244 for setting.

The stepping of the carriage 249 to advance it one column after each setting, is effected by an escapement device 264 mounted on the carriage 249 (Figs. 28 and 29). The escapement device includes a pinion 265 adapted to cooperate with a rack 266 to hold the carriage in position with respect to any particular column of stops 244. A tape 267 provided with a weight 268 (Fig. 5) tends to move the carriage 249 toward the right. An escapement ratchet 269 fixed with respect to the pinion 265 cooperates with escapement pawls 270, 271. Pawl 270 is relatively fixed while pawl 271 is pivotally mounted as in Fig. 26 and is adapted to move through a slight arc and is provided with a spring 272 to normally pull it forward. By pressing downwardly on the plate 273, pawl 270 will be moved out of cooperation with the ratchet while pawl 271 moves into cooperation. This will permit the carriage to escape partly and when the pawl 271 is permitted to rise out of engagement with the ratchet and pawl 270 moves back into engagement the carriage will move the balance of its distance completing a movement of one step or one column and the parts will then be in position for the setting of the stops 244 in the next column.

After the machine has been used with any particular set up and it is desired to restore the stops 244 to make a new set up, the pinion 265 will be raised out of engagement with rack 266 as in Fig. 28 and the carriage 249 will be moved its full distance to the left in Fig. 26 so that the ribs 251 will release all of the stops 244. The operator will then move a knob 274 as far back as it will go in Fig. 26 or to the right in Fig. 27. This knob is fixed in a rack 275 which meshes with a gear 276 mounted on a rod 277. The other end of the rod 277 has a gear 276a connected with a similar rack 275a. These two racks are interconnected by a link 278 which reaches across all of the stops 244. Thus, when the knob 274 is moved, it will cause the link 278 to push all of the stops 244 back to their normal or inoperative positions. The plate 231 which supports the punches 230, and the stops 244 may be raised relatively to the die plates 232, 233. For this purpose, the plate 231 is fixed to rods 279 reaching upwardly to the hollow posts 236 (Fig. 7). The lower ends of the rods 279 are provided with rack teeth 280 (Fig. 2) meshing with gear sectors 281. Sectors 281 are mounted on a common shaft 282 which in turn has a bifurcated arm 283 fixed thereto and adapted to be rocked by pin and slot connection 284 with a nut 285 carried by a screw 286. The turning of a crank or wheel 287 on the screw serves to move the plate 267 up or down as desired (Figs. 2 and 5).

Figure 46:
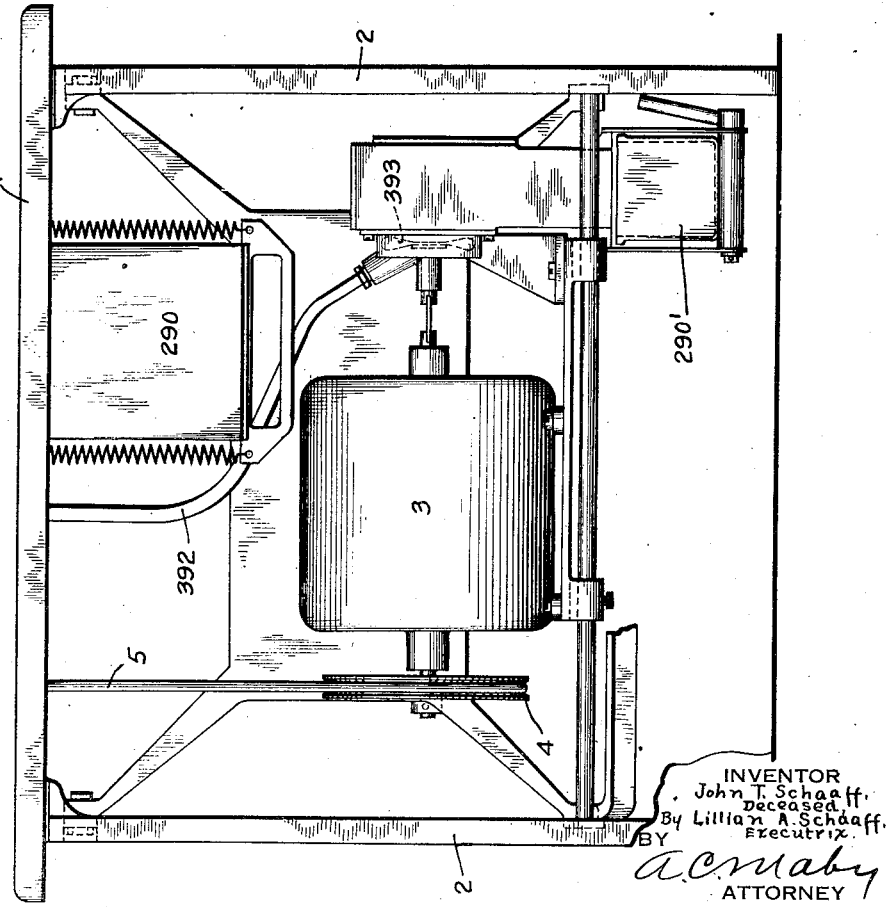
Fig. 46 is a detail view of the driving motor for the machine.

A chute formed in two parts 288, 289 (Fig. 9) is provided below the die plate 233 to receive the chips or cuttings from the punched cards to carry them to a receiving tray 290 (Figs. 2 and 46).

Hand punching

The hand punching is done by twelve punches 87 shown in Fig. 9. These twelve punches are arranged in a single column corresponding to one of the columns on the card of Fig. 21. In Figs. 17 and 18 one of the punches is shown along with the mechanisms for operating it to punch a card. Similar operating mechanisms are employed for each of the punches. The punches are mounted in a supporting member 291 and a die 292. The card when being punched is between the die 292 and the cutting die 293. A bell crank 294 pivoted at 295 is provided to raise the punch to perforate the card. An actuating link 296 is connected at one end to the lower end of the bell crank and is provided at its other end with a hook projection 297 normally resting above the rocking plate 298. A latch 299 carried by an arm 300 is adapted to cooperate with projection 301 on the link 296 to pull the latter down into cooperation with the rocking plate 298. A bell crank 302 is connected to a link 303 which when moved to the right as in Fig. 17 causes the parts to be depressed. Lying under the ends of all of the links 296 is a bail 304 pivoted at 305. This bail in turn rests over an operating hook 306 which is pivoted at its left hand end to an arm similar to bell crank 294 but without the horizontal arm of the bell crank. When any one of the links 296 is depressed, it will move the operating hook 306 from its normal position of Fig. 13 and into the path of a star wheel 307 as in Fig. 17. This wheel which is normally running will then move the hook to the right, rocking the plate 298 through the connection 308 as shown in Fig. 19. The rocking of the plate 298 to the right will pull the hook link 296 and thus operate the punch. While this is being done the operating hook 306 will be cammed up by a stud 309 until it disengages the operating star wheel. This, in turn, will lift the link 296 out of cooperation with the rocking plate 298. When the link 296 is moved to the right, the latch 299 is held by a rod 310 so that the rod 296 is free to rise after the punching has been effected.

Each of the links 296 is provided with a projection 311 cooperating with the escapement bail 97 so that as it operates to effect punching, it will move this bail to the right. Also freely mounted on an arm similar to the bell crank 294 but lacking the cross arm thereof is a link 312 supported at its right hand end on a stud 313 cooperating with an oblique slot 314 in the link. The link is provided with a projection 315 to the right of the escapement bail 97 so that when the latter is moved to the right, it will move the link 312 to the right also, causing the latter to ride upwardly on the stud 313 so that the end 316 will move into the path of a second star wheel 317 mounted on the same shaft 318 (see also Fig. 14). The timing of the operations is such that after the operating hook 306 has been raised to the position of Fig. 18, free of the star wheel 307, the end 316 of the restoring link 312 will be in the position of Fig. 18 so that its star wheel 307 will push it back toward the left to its normal position. This will rock the escapement bail 97 back to normal position and the bail will in turn push the link 296 back to the left. The operating hook 306 is also provided with a projection 311 cooperating in the same manner as link 296 with the escapement bail so that the hook is also restored to its normal position.

The links 303 are all slidably mounted on a support 319 and normally held to the left by springs 320. Each of these sliding links is provided with several projections 321. Below the slides 303 are several rocking plates 322 (Figs. 13 and 20) pivoted at 323. Each of these rocking plates reaches across all of the twelve slides 303 and is provided with one or more upward projections 324 adapted to cooperate with projections 321 on certain of the slides 303. The plates 322 are pivoted at 325, 326 in a common carrying frame 327. A spring 328 associated with each plate 322 holds the latter in its normal position.

By rocking the plates clockwise as viewed in Figs. 13, 17 and 18 one or more of the slides 303 will be moved to the right to operate the corresponding punches 87. For rocking these plates 322, each plate is provided with a laterally projecting arm 329 adapted to cooperate with one of the key arms 330.

The key arms are mounted in upper and lower supporting members 330a, 330b (Fig. 14) and are held in normal upper position by individual springs 330c. A key interlocking device 330d may be provided for preventing more than one key from being depressed at a time; a projection 330e on the key arms reaching between the elements of the device for this purpose. Such an interlocking device is shown in my United States Patent No. 1,803,979, dated May 5, 1931.

As shown in Fig. 20, each key arm is provided with a hook projection 331 for cooperating with the projection 329. Depression of the key 332 serves to rock the plate 322 and move one or more of the slides 303 toward the right as viewed in Figs. 17 and 18.

The frame 327 which carries the rocking plates 322 is mounted on four arms 333 (Figs. 13, 14, 16 and 20). Integral with one of the arms 333 (see Fig. 14) is a horizontal arm 334 having pin and slot connection with a shift key 335. Normally, the frame 327 occupies the rearward position as in Fig. 14. In this position, most of the projections 329 on the rocking plates 322 are out of position with respect to the hooks 331 on the keys, and the projections 324 on the rocking plates are out of position with respect to the slides 303.

Referring to Fig. 16, it will be seen that 12 of the keys are associated with the ten numerals and the X and R positions representing the twelve index point positions in each column of the card (Fig. 21). When the frame 327 is in its rearward position, these twelve keys are adapted to cooperate with the rocking plates 322 to effect the sliding operation of any one of the twelve slides 303. Fig. 16 shows some of the projections 324 out of alignment with the slides 303. These represent the keys other than the twelve representing the numerals. Certain other projections 324 are shown in alignment with the slides 303 and these are the ones that represent the numeral keys including the R and X positions. In this normal position, the hooks 331 on the numeral key arms 330 are in operative position with respect to the rocking plate arms 329 so that when any one of the numeral keys is depressed, it will rock its plate 322. This is the position of the parts when the machine is being used to punch only one hole in each column to represent one of the numerals.

When it is desired to punch the card to represent the characters of the alphabet, the frame 327 will be moved to the left as shown in view in Fig. 14. This will move the projections 324 to operative positions with respect to the slides 303 for alphabet punching and will move the projections 329 into operative relation with the hooks 331. With respect to the hooks 331 which are already in operative relation with arms 329 as in Fig. 20a the projections will move to the dotted line position and continue to be in operative position with respect to the hooks 331. The positions of the projections 324 on the corresponding rocking plate 322 will be changed so that the numeral keys will then be adapted, when depressed, to punch the combinations of perforations to represent the alphabet characters shown on the keys.

When the shift key is depressed it will rock the arms 333 to move the frame 327 with rocking plates 322 to the left and will be locked in this position by cooperation with the latching members 336 (Fig. 14). Now when one of the keys is depressed, two of the slides 303 shown in Figs. 17 and 18 will be moved and two of the punches 87 will be operated.

Space Key

In Fig. 16 a space key 337 is shown cooperating with the projection 329a on the rocking plate 322. This particular rocking plate has a wide projection 324 cooperating with the sliding bar 303 which serves to directly operate the hook 306, the latter being provided with a projection 301 to be operated by a latch 299 in the manner similar to the operation of the individual members 296. The depression of the hook member 306 through this particular key serves to operate the escapement bail 97 to cause the carriage to escape one column. In Fig. 16, the projection 324 is shown in cooperation with the slide 303 while the frame 327 which carries all of the rocking members 322 is in its rear position for punching numerals only. When the frame 327 is shifted forward to punch alphabetical characters, the projections 324 continues to cooperate with the slide 303 so that the space key can still be used to space the card one column when alphabetical characters are being punched. Also the projection 329a which is in cooperation with the space key arm 337 in Fig. 16 will continue this cooperation when the frame 327 is moved forward.

Skip key

It is common in punching cards for particular kinds of work, to perforate certain columns on the card and to skip particular groups of columns. This is commonly accomplished by placing a cam bar on the escapement rack of the card carriage to cooperate with a skip bar associated with the escapement mechanism. This skip bar is controlled by the regular X key which is also the key which may be used to punch the "11" or "X" position in the column on the card.

Figure 42:
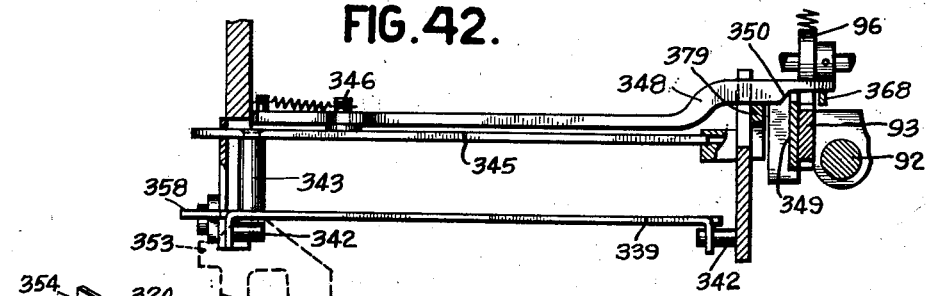
Fig. 42 is a detail of the carriage skip lifter mechanism.
Figure 43:
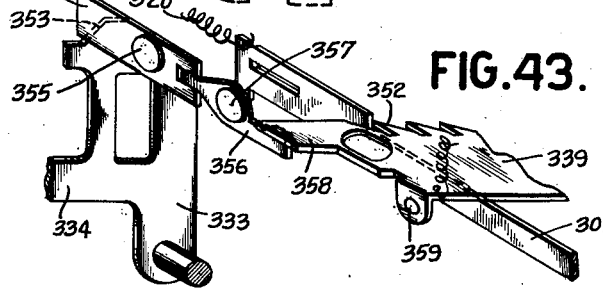
Fig. 43 is a perspective view of mechanism shown in Fig. 42 by which one of the punch keys may serve as a carriage escapement or spacing key.

In Fig. 16 this key is shown at 338 and operates the sliding link 303a which is the next to the rearmost of the slides. Directly above all of the slides 303 is a cam plate 339 (Figs. 13, 14, 16). As seen in Fig. 16, when the slide 303a is actuated its shoulder 340 will cooperate with a cam surface 341 and move the whole plate back or to the right as viewed in Fig. 42, the plate being mounted on studs 342 for this purpose. As shown in Figs. 16 and 42, slide 345 carries a fixed post 343 reaching downwardly into a slot 344 in the plate 339. The cam plate then moves the slide 345 to the right in Fig. 42. Slide 345 has a pin 346 reaching into a slot 347 in the skip bar 348. As shown in Figs. 33 and 42, the lifter 348 reaches under the escapement pawl 96 and over the cam bar 349 which is attached to the side of the escapement rack 93. The skip bar 348 has a cam shoulder 350. When the slide 345 is moved to the right in Fig. 42 it moves the skip bar 348 and causes it to be cammed upwardly by the cam bar 349 to lift the escapement pawl out of cooperation with the rack 93. The card carriage will then escape and continue to travel until the skip bar 348 reaches a notch 351 in the bar 349. The skip bar will then drop into this notch and permit the escapement pawl to reengage the escapement rack and stop the carriage in position for the next punching operation. The cam plate 339 as shown in Fig. 16 is provided with additional cam surfaces 352 corresponding with each of the slides 303. When the plate 339 is moved rearwardly as in Fig. 16, these additional cam surfaces will be in position to cooperate with any of the slides 303 so that when any numeral key is thereafter depressed its particular slide 303 will cooperate with the cam surfaces 352 to restore the plate 339 to its normal position. This, in turn, will restore the lifter 348 to its normal position.

When the frame 327 is moved forward by the shift key to punch alphabetical characters, the plate 339 is lifted to inoperative position. For this purpose, the shift key arm is provided with a cam member 353 as shown in Figs. 20 and 42. When the shift key is depressed, it will rock a lever 354 about its pivot 355 and this in turn will rock a lever 356 about pivot 357. The lever 356 cooperates with a projection 358 on the cam plate 339 and rocks it about its axis 359 on the studs 342. The slot connection at 343, 344 (Fig. 16) between the plate 339 and plate 345 will permit the rocking of plate 339 in this manner.

Tabular key

Figure 36:
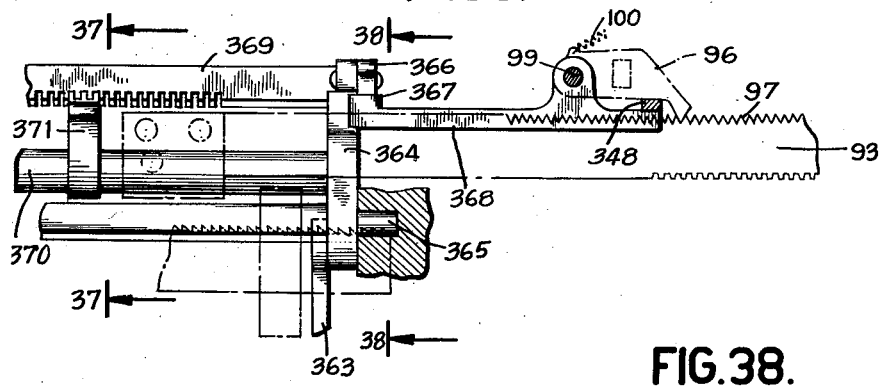
Fig. 36 is a detail partly in section of the carriage escapement mechanism.
Figure 38:
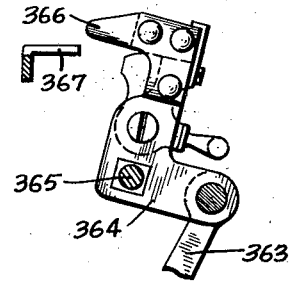
Fig. 38 is a detail taken on line 38—38 of Fig. 36.
Figure 39:
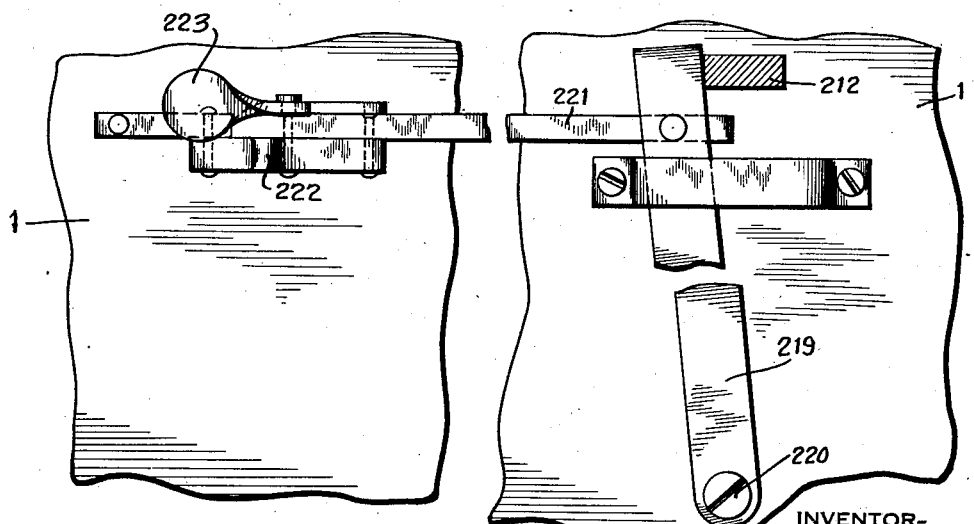
Fig. 39 is a detail of control mechanism shown in Fig. 1 for controlling the operation of the serial numbering device.

The tabular key is adapted to cause the card carriage to skip from any position to any desired intermediate position. The intermediate positions may be determined by the setting of tabular stops in a manner similar to that commonly employed in typewriting machines. The tabular key is shown at 360 (Figs. 1, 3, 9). The key arm 361 is pivoted at 362 and connected at its rear end to a link 363 which connects to frame 364 pivoted at 365 (Fig. 9) to a fixed part of the machine. When the key is depressed, the frame 364 (Figs. 14 and 38) will rock counterclockwise and a projection 366 will engage and depress the projection 367 on a lever 368 (see also Fig. 36). This lever is loosely pivoted at 99 and reaches under the skip lifter 348 and by lifting the latter also lifts the escapement pawl 96 out of the rack 97 and permits the rack with the card carriage to move toward the left.

Figure 37:
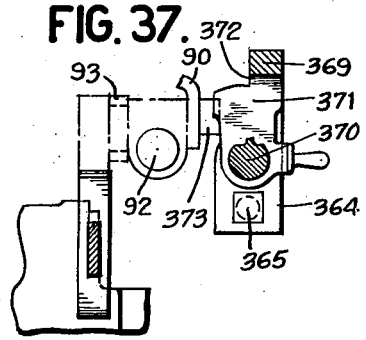
Fig. 37 is a detail taken on line 37—37 of Fig. 36.

The frame 364 reaches across the back of the card carriage as shown in Figs. 1 and 3 and has a toothed bar 369 (Figs. 36 and 37) and a rod 370. Mounted on the rod 370 are several stops 371 having teeth 372 adapted to mesh with the teeth in the bar 369. By rocking stops 371 on rod 370 (Fig. 37) they may be be detached from the locking bar 369 and moved along the rod 370 to various desired positions and then rocked back into locking engagement with bar 369. When the carriage is released, it will travel toward the left until the stop 373 (Fig. 37) on the carriage engages one of the stops 371.

*Release key*

Figure 40:
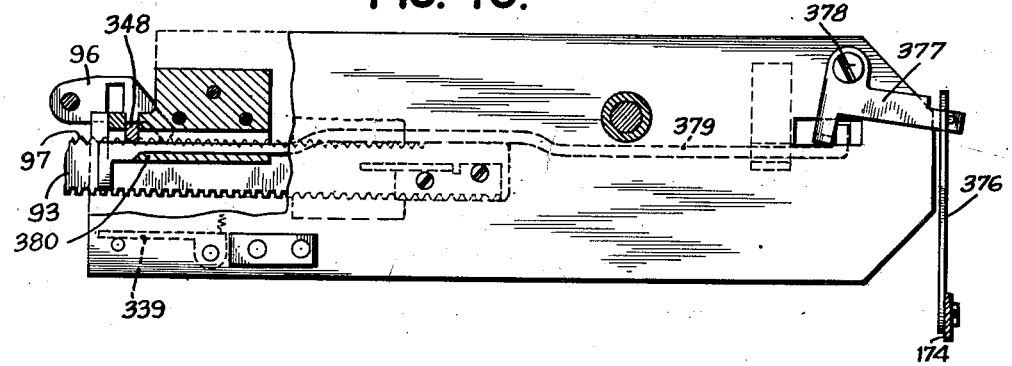
Fig. 40 is a detail of the carriage release key mechanism.
Figure 41:
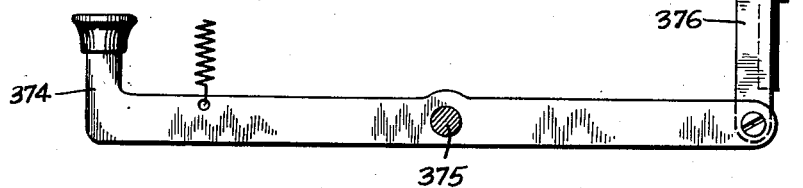
Fig. 41 is a detail of the key for controlling the mechanism of Fig. 40.

A release key 374 (Figs. 1, 2, 3 and 41) is pivoted at 375 and connected at its rear end to the link 376 (Figs. 13 and 40). When the key is depressed it will rock the arm 377 counterclockwise about its pivot 378 and move the cam link 379 to the right in Fig. 40. This link will be cammed upwardly by shoulder 380 and will lift the skip-lifter 348 to remove the escapement pawl 96 from the ratchet 97 and permit the carriage to escape its full distance to the left.

*Operating shaft drive*

The operating shaft 318 (Fig. 13) is effected as follows:

As shown in Fig. 11, the shaft 73 is provided with bevel gear 381 meshing with a bevel gear 382 fixed with respect to a clutch member 383. A sliding clutch member 384 on shaft 385 is adapted to cooperate with member 383 to drive the shaft. Shaft 385 has fixed thereto a gear 386 meshing with an idler gear 387 (Fig. 22). Gear 387 meshes with a gear 388 fixed on shaft 318 which carries the driving pawls 307.

When the crank 156 is rocked to the position of Fig. 22 to set the machine for hand punching, the cam 389 will rock the arm 390 and move the clutch member 384 into cooperation with clutch member 383. This will then cause the operating shaft 318 to turn continuously while the machine is being used for hand punching.

*Removal of chips*

Figure 47:
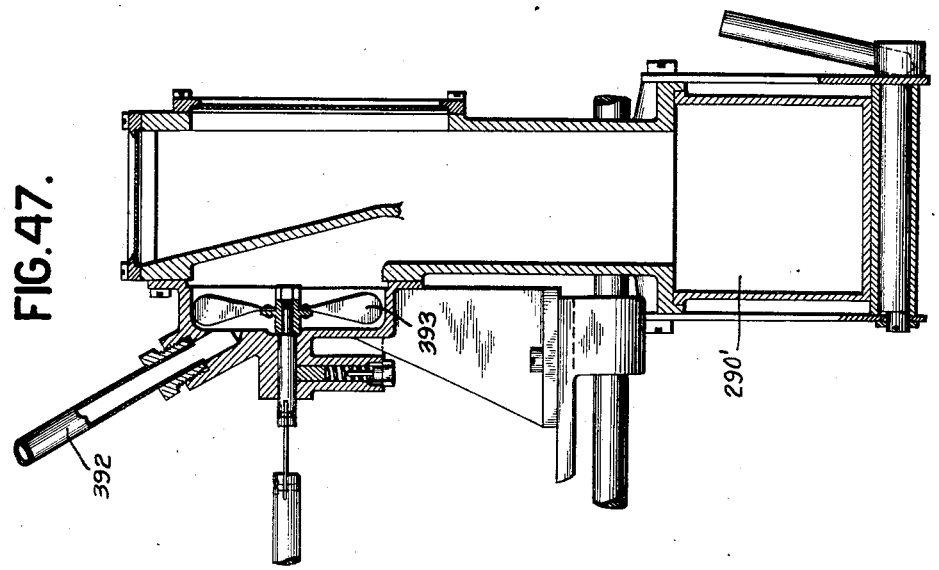
Fig. 47 is an enlarged detail view partly in section of means for causing disposal of waste punched from the cards.

As the cards are being punched by the hand operated punches 87 the chips that are cut out are forced upwardly into a compartment 391 (Figs. 9, 13 and 14). A tube 392 connects this compartment to the receiving tray 290' as shown in Figs. 46, 47. A fan 393 driven by the motor 3 supplies a current of air adapted to draw the chips from the chamber 391 into the tray 290'.

*Card counter*

Figure 44:
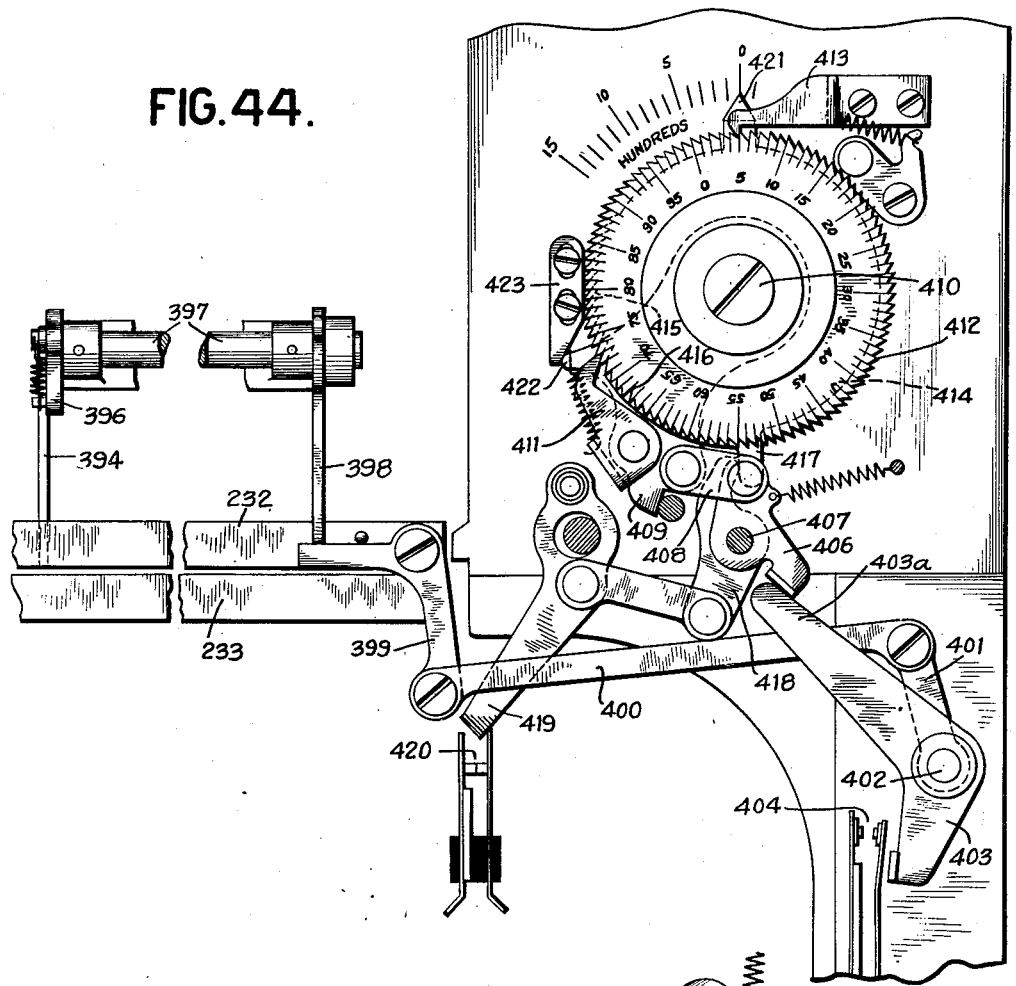
Fig. 44 is a detail of mechanism adapted to control the number of cards fed through the machine when used as an automatic gang punching or serial numbering machine.
Figure 45:
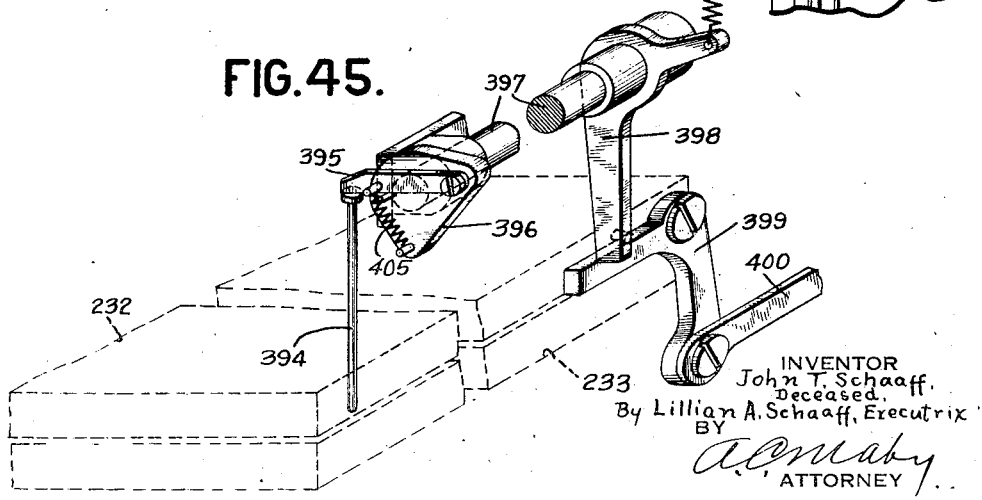
Fig. 45 is a perspective of part of the mechanism shown in Fig. 44.

A counting device is provided to count the cards run through the serial numbering and gang punching mechanisms and to cause the machine to stop after a predetermined number of cards have run through. This device is shown in Figs. 44 and 45. A sensing pin 394 reaches through a hole in the upper die plate 232. This pin is connected to a finger 395 pivotally mounted on a member 396 fixed on shaft 397. A latch 398 is also fixed on shaft 397. Pivotally mounted on the upper die plate 232 is a bell crank 399. This bell crank is connected by a link 400 to arm 401 fixed on a shaft 402 which in turn carries an arm 403 adapted to cooperate with electric contacts 404. When the die plates 232 and 233 are raised to effect punching, the card will be pressed upwardly against the finger 394. This will tend to rock the shaft 397 to move the latch 398 over bell crank 399. If for any reason the shaft cannot rock the spring 405 will yield. Whenever there is a card between the dies, latch 398 will hold the left end of bell crank 399 down so that as the dies rise this bell crank will turn counterclockwise, moving link 400 to the right. This will rock arm 403 and close the contacts 404.

The closing of these contacts will keep the machine running. If there is no card between the dies, latch 398 will not interfere with the bell crank 399 and the latter will rise without turning about its pivot and contacts 404 will remain open and will cause the machine to stop.

The upper end 403a of arm 403 will, whenever it is rocked, rock an arm 406 pivoted at 407. A link 408 connects arm 406 to an arm 409 loosely mounted on the stud shaft 410. Arm 409 carries a spring pressed actuating pawl 411 cooperating with the ratchet teeth of a units counting wheel 412. Actuation of arm 406 causes the pawl 411 to turn the wheel 412 one tooth in a clockwise direction. The latching pawl 413 will hold the wheel in such position. Back of the wheel 412 is a hundreds counting wheel 414 shown in dotted lines. The hundreds counting wheel has a smaller number of teeth 415 depending upon its capacity; there being one tooth for each hundred cards to be punched. If a number of cards less than 100 is to be punched as, for instance, 75, the units wheel 412 will be manually set in a counterclockwise direction to a point where the scale number 75 will register with the tooth of the holding pawl 413. As each card is punched the wheel 412 will be turned clockwise one tooth. When the wheel reaches its zero position, that is, when the zero point on the scale registers with the holding pawl 413 the actuating pawl 411 will register with a deep tooth 416 in the wheel 412 and will engage one of the teeth 415 in the hundreds wheel and tend to turn the latter. A projection 417 on the hundreds wheel will engage the upper end of an arm 418 loosely pivoted at 407 and rock this arm counterclockwise. This will pull the arm 419 to the left and open contacts 420. The opening of these contacts will cause the machine to stop.

If a number of cards larger than 100 is to be punched, for instance, 325, the hundreds wheel 414 will be turned counterclockwise so that its index 421 will register with the hundreds scale at 3. Also the units wheel 412 will be turned to register 25 with the holding pawl 413. Now when the units wheel has turned 25 steps the pawl 411 will enter the notch 416 and turn the hundreds wheel one step back towards its zero position. At the end of the next hundred cards the units wheel 413 will have turned an additional revolution and the hundreds wheel will be turned one more step. After the hundreds wheel has been turned three steps the number of cards desired will have been punched and the projection 417 will cause contacts 420 to open to stop the machine. Integral with the arm 409 is a projection 422 cooperating with an adjustable stop 423, which may be set to accurately adjust the position to which the wheel 412 can be turned during each operation.

*Wiring diagram*

The wiring diagram is shown in Fig. 12a. The operating motor 3 is supplied from a source 424 and may be started by depressing the start key 425. This will close the contacts 426 to complete the circuit through the motor as follows: from line 427, through motor 3, wire 428, contacts 426, wire 429, back to the source. This will energize relay magnet 430 and close relay contacts 431 so that when the start key 425 is released the circuit will continue as follows: from line 427 through motor 3, contacts 431, contacts 432, which are normally closed, make and break contacts 433, 434, which permit the current to pass excepting for a short interval during each cycle, wire 435, back to line 429. During the instant that the contacts 433, 434 are both open current will flow around these contacts, through contacts 436 which are normally closed and contacts 404 and 420 which are closed during that moment.

If contacts 420 are not closed in the manner described in connection with Fig. 44, due to the absence of the card in the punching position, the current will fail at this point and the machine will stop. Also if contacts 404 have been opened during this particular moment due to the completion of the punching of the desired number of cards, the current will fail at this point and stop the machine.

The contacts 432 are shown in Fig. 9, and are adapted to be opened by an arm 437 fixed with respect to a feeler finger 438 which is actuated by spring pressure against the bottom of the stack of cards 15. After the last card has been fed out of the hopper the finger 438 will be free to rock upwardly through a hole 439 in the card weight 440. This will cause the contacts 432 to open and will cause the machine to stop.

While there is shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is intended to be limited therefore by the scope of the following claims.

Having described the invention, what is claimed and desired to be secured by Letters Patent is:

1. In a record perforating machine, a plurality of punches, a die plate associated with said punches, means for moving the die plate to press a record against the punches to effect perforating, and a record counting device operated by movement of the die plate.

2. In a record perforating machine, a plurality of punches, a die plate associated with said punches adapted to be moved to press a record against the punches to effect perforating, a counting device connected to said die plate to be operated by movement thereof, and means for stopping the movement of the die plate when there is no record in perforating position.

3. In a record perforating machine, a plurality of punches, keys associated with said punches and adapted to cause selective operation thereof, means for causing one of said keys to effect feeding of a record without operating a punch, and means for differently associating the punches with the keys for causing said one of said keys to cause operation of a punch.

4. In a record perforating machine, a gang punching device and a hand punching device, means for feeding records from the gang punching device to the hand punching device, and means for stopping the machine when there is no record in the gang punching device.

5. In a record perforating machine, a supply hopper, an automatic punching device and a hand controlled punching device, means for feeding records from the hopper to the automatic punching device, means for feeding records from the automatic punching device to the hand punching device, means for stopping the machine when there is no record in the automatic punching device, and additional means for stopping the machine when there is no record in the hopper.

6. In a perforating machine, a plurality of rows of punches, sliding stops associated with each row and adapted to be selectively set for causing operation of the punches, and a locking plate for locking the punches in set position.

7. In a record perforating machine, a plurality of rows of punches, stops adapted to be selectively set for controlling operation of the punches, and a sliding selecting device movable into cooperation with each row of punches for effecting setting of the stops in the successive rows.

8. In a record perforating machine, a plurality of rows of punches, means for effecting selective operation of the punches of a row, and means for effecting step by step advancement of said selecting means for cooperation with successive rows of punches.

9. In a record perforating machine, a plurality of rows of punches, means for effecting selection of punches in each row for operation, means for effecting step by step advancement of said selecting means, and locking means operative by the advancement of said setting means for locking the setting.

10. In a record perforating machine, a plurality of rows of punches, a plurality of stops associated with each row and adapted to be selectively set with respect to the punches to render the punches operative, and means for locking certain of said stops against setting.

11. In a record perforating machine, a plurality of rows of punches, a sliding stop associated with each of said punches, a movable setting device adapted to set said stops with respect to the punches and means for advancing said setting device from one of said stops to the next.

12. In a record perforating machine, a plurality of punches, a plurality of sliding stops associated with said punches, means for effecting selective setting of said stops, and common means for restoring the stops to normal position.

13. In a record perforating machine, a plurality of punches, a plurality of stops associated with said punches and adapted to be selectively set to control operation of the punches, a carriage including a setting device for setting said stops and means carried by said carriage for locking said stops in said position.

14. In a perforating machine, a set of punches, power operating means, keys adapted when actuated to select certain of said punches for operation and a common connecting device operated by said keys for connecting the selected punches to said power means for operation.

15. In a record perforating machine, a set of punches, normally operating power means for operating the punches, a set of keys for selecting said punches for operation, an element adapted to cooperate with said power means to operate the punches and a common member operated by selection of said punches for causing said element to cooperate with said power means to effect operation of the selected punches.

16. In a record perforating machine, a gang punching device, and a hand controlled punching device, means for feeding a record from the gang punching device to the hand controlled punching device, and means for automatically feeding a record to the gang punching device when a record is fed to the hand controlled punching device.

17. In a record perforating machine, an automatic punching device, and a power actuated hand controlled punching device, means for feeding records to the automatic punching device, and means for feeding records from the automatic punching device to the hand controlled punching device, and common means adapted when set to cause records to be removed from a hand controlled punching device and to disconnect the power operating means of the hand controlled punching device.

18. In a record perforating machine, a plurality of punches, keys for selectively operating said punches for perforating a record, column feeding means for feeding the card relative to the punches in response to operation of each key, additional feeding means for feeding records to said punches, and means for numbering records being fed to the punching device by said additional feeding means.

19. In a record perforating machine, an automatic punching device, a hand controlled punching device, a power means associated with said hand control punching device, means for feeding records from the automatic punching device to the hand controlled device, means for rendering the power element of the hand controlled device inoperative and means brought into operation by said last named means for removing the records from the hand controlled device.

LILLIAN A. SCHAAFF,
*Executrix of the Estate of John T. Schaaff, Deceased.*